US011941614B2

(12) United States Patent
Guo et al.

(10) Patent No.: US 11,941,614 B2
(45) Date of Patent: Mar. 26, 2024

(54) DATA RESOURCE PROCESSING METHOD AND APPARATUS, COMPUTER STORAGE MEDIUM, AND ELECTRONIC DEVICE

(71) Applicant: TENCENT TECHNOLOGY (SHENZHEN) COMPANY LIMITED, Guangdong (CN)

(72) Inventors: Huidong Guo, Guangdong (CN); Dongdong Xie, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/711,655

(22) Filed: Apr. 1, 2022

(65) Prior Publication Data
US 2022/0222659 A1 Jul. 14, 2022

Related U.S. Application Data

(63) Continuation of application No. PCT/CN2020/128289, filed on Nov. 12, 2020.

(30) Foreign Application Priority Data

Mar. 16, 2020 (CN) .......................... 202010181015.8

(51) Int. Cl.
G06Q 20/38 (2012.01)
(52) U.S. Cl.
CPC .................................. *G06Q 20/381* (2013.01)
(58) Field of Classification Search
None
See application file for complete search history.

(56) References Cited

U.S. PATENT DOCUMENTS 10,185,995 B2 * 1/2019 Bartko ................... G06Q 30/06
2002/0161692 A1 * 10/2002 Loh ......................... G06Q 40/00
705/37

(Continued)

FOREIGN PATENT DOCUMENTS

CN 106780013 A 5/2017
CN 109166045 A 1/2019
(Continued)

OTHER PUBLICATIONS

W. Yu et al., "A Survey on the Edge Computing for the Internet of Things," in IEEE Access, vol. 6, pp. 6900-6919, 2018, doi: 10.1109/ACCESS.2017.2778504. (Year: 2018).*

(Continued)

*Primary Examiner* — Elizabeth H Rosen
(74) *Attorney, Agent, or Firm* — ARENTFOX SCHIFF LLP

(57) ABSTRACT

The present disclosure includes a data resource processing method. In the method, a data resource transfer request from a service target is received, the data resource transfer request including a target data resource type, an original data resource type, and a target data resource transfer amount. An original data resource transfer amount according to the target data resource transfer amount is determined, and the data resource transfer request is transmitted to a service provider. Response information in response to the data resource transfer request is obtained and an equity amount of the original data resource type according to the target data resource transfer amount and the actual deduction amount is obtained. Also, amount transfers between a first-type system account of the service target, a second-type system account of the service provider, and a system equity account are performed accordingly.

20 Claims, 21 Drawing Sheets

(56) References Cited

U.S. PATENT DOCUMENTS

| | | | | |
|---|---|---|---|---|
| 2005/0269396 | A1* | 12/2005 | Schofield | G06Q 30/04 235/379 |
| 2005/0283422 | A1* | 12/2005 | Myr | G06Q 30/08 705/37 |
| 2009/0037324 | A1* | 2/2009 | McLaughlin | G06Q 30/08 705/39 |
| 2011/0258686 | A1* | 10/2011 | Raj | G06Q 20/10 726/6 |
| 2017/0018029 | A1 | 1/2017 | Eiriz et al. | |
| 2019/0114627 | A1* | 4/2019 | Tang | G06Q 20/00 |
| 2021/0174352 | A1* | 6/2021 | Kenney | G06Q 20/3224 |

FOREIGN PATENT DOCUMENTS

| | | |
|---|---|---|
| CN | 110427558 A | 11/2019 |
| CN | 110443558 A | 11/2019 |
| CN | 110473107 A | 11/2019 |
| CN | 110599290 A | 12/2019 |
| CN | 110706110 A | 1/2020 |
| CN | 111161073 A | 5/2020 |
| CN | 111445327 A | 7/2020 |

OTHER PUBLICATIONS

International Search Report dated Feb. 20, 2021 issued in corresponding application PCT/CN2020/128289 (with English translation).

Written Opinion dated Feb. 19, 2021 issued in corresponding application PCT/CN2020/128289.

Office Action dated May 11, 2021 issued on corresponding Chinese patent application No. 2020101810158.

Office Action dated Aug. 19, 2021 issued in corresponding Chinese patent application No. 2020101810158.

Office Action dated Sep. 29, 2021 issued in corresponding Chinese patent application No. 2020101810158.

* cited by examiner

DATA RESOURCE PROCESSING METHOD AND APPARATUS, COMPUTER STORAGE MEDIUM, AND ELECTRONIC DEVICE

RELATED APPLICATION

This application is a continuation of International Application No. PCT/CN2020/128289, entitled "DATA RESOURCE PROCESSING METHOD AND APPARATUS, COMPUTER STORAGE MEDIUM, AND ELECTRONIC DEVICE" and filed on Nov. 12, 2020, which claims priority to Chinese Patent Application No. 202010181015.8, filed on Mar. 16, 2020. The entire disclosures of the prior applications are hereby incorporated by reference in their entirety.

FIELD OF THE TECHNOLOGY

This application relates to the field of computer technologies, including a data resource processing method and apparatus, a computer storage medium, and an electronic device.

BACKGROUND OF THE DISCLOSURE

Foreign currency is a creditor's right that is held by a monetary administration (the central bank, the currency management agency, the foreign currency stabilization fund, and the Ministry of Finance) in the form of bank deposits, Treasury bills of the Ministry of Finance, long-term and short-term government securities, or the like and that can be used when balance of payments is in deficit. The foreign currency may include a currency of a foreign country, foreign currency deposits, foreign currency securities (government bonds, Treasury bills, corporate bonds, stocks, etc.) and foreign currency payment certificates (bills, bank deposit certificates, postal savings certificates, etc.).

In data resource management, a same user object (or user) may have a plurality of (at least two) data resource (for example, foreign currency) accounts, and there is a need for a resource transfer between different types of system accounts. In the related art, the user cannot be helped to quickly and conveniently complete a resource transfer service.

SUMMARY

The present disclosure includes a method, apparatus, and a non-transitory computer-readable storage medium storing instructions for data resource processing.

An embodiment of the present disclosure provides a data resource processing method. In the method, a data resource transfer request is received from a service target, the data resource transfer request including a target data resource type, an original data resource type, and a target data resource transfer amount. An original data resource transfer amount is determined according to the target data resource transfer amount. The data resource transfer request is transmitted to a service provider. Response information in response to the data resource transfer request is received from the service provider, the response information including an actual deduction amount of the original data resource type. An equity amount of the original data resource type is obtained according to the target data resource transfer amount and the actual deduction amount. Also, amount transfers between a first-type system account of the service target, a second-type system account of the service provider, and a system equity account are performed according to the equity amount, the original data resource transfer amount, the actual deduction amount, and the target data resource transfer amount.

An embodiment of the present disclosure further provides a data resource processing apparatus that includes processing circuitry configured to receive a data resource transfer request from a service target, the data resource transfer request comprising a target data resource type, an original data resource type, and a target data resource transfer amount. The processing circuitry is configured to determine an original data resource transfer amount according to the target data resource transfer amount, transmit the data resource transfer request to a service provider, and obtain response information in response to the data resource transfer request from the service provider, the response information comprising an actual deduction amount of the original data resource type. The processing circuitry is configured to obtain an equity amount of the original data resource type according to the target data resource transfer amount and the actual deduction amount, and perform amount transfers between a first-type system account of the service target, a second-type system account of the service provider, and a system equity account according to the equity amount, the original data resource transfer amount, the actual deduction amount, and the target data resource transfer amount.

An embodiment of the present disclosure further provides a non-transitory computer-readable storage medium storing instructions which when executed by at least one processor cause the at least one processor to process data resource. A data resource transfer request is received from a service target, the data resource transfer request including a target data resource type, an original data resource type, and a target data resource transfer amount. An original data resource transfer amount is determined according to the target data resource transfer amount. The data resource transfer request is transmitted to a service provider. Response information in response to the data resource transfer request is received from the service provider, the response information including an actual deduction amount of the original data resource type. An equity amount of the original data resource type is obtained according to the target data resource transfer amount and the actual deduction amount. Also, amount transfers between a first-type system account of the service target, a second-type system account of the service provider, and a system equity account are performed according to the equity amount, the original data resource transfer amount, the actual deduction amount, and the target data resource transfer amount.

For example, according to one or more embodiments of this application, when receiving a data resource transfer request from a service target, a system can automatically determine an original data resource transfer amount according to a target data resource transfer amount carried in the data resource transfer request, obtain response information for the data resource transfer request, and determine an equity amount according to the original data resource transfer amount and an actual deduction amount carried in the response information, so as to perform amount transfers between various system accounts of the service target, a service provider, and the like according to the equity amount, the original data resource transfer amount, the actual deduction amount, and the target data resource transfer amount. Accordingly, in some examples, a calculation amount can be reduced, fewer system resources are occupied, a running speed can be improved, and the data resource transfer request from the service target can be timely and accurately responded to. On the other hand, in some embodiments, a user only needs to submit a data resource transfer request through one click or tap, and the system can automatically complete the amount transfers between various system accounts. When the system is applied to a foreign currency trade scenario, an automatic and intelligent foreign currency service can be implemented.

DESCRIPTION OF EMBODIMENTS

Exemplary implementations are now described more comprehensively with reference to the accompanying drawings. However, the examples of implementations may be implemented in various forms, and it is not to be understood as being limited to the examples described herein; and conversely, the implementations are provided to make this application more comprehensive, and comprehensively convey the idea of the examples of the implementations to a person skilled in the art.

In addition, the described features, structures, or characteristics may be combined in one or more embodiments in any appropriate manner. In the following descriptions, a lot of details are provided to give a full understanding of the embodiments of this application. However, a person skilled in the art is to be aware of that, the technical solutions in this application may be implemented without one or more of the particular details, or other methods, components, apparatuses, or steps may be adopted. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may vary depending on an actual situation.

Figure 1:
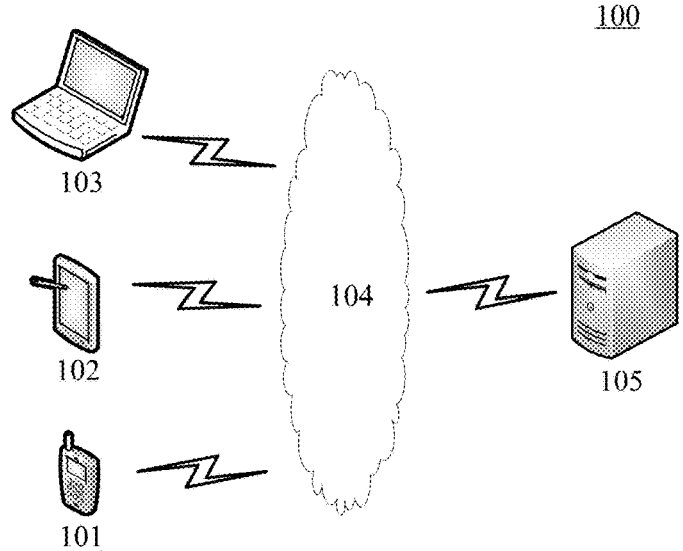
FIG. 1 is a schematic diagram of a system architecture of a data resource processing system according to an embodiment of this application.

FIG. 1 is a schematic diagram of a system architecture 100 to which a data resource processing system according to an embodiment of this application is applicable.

As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 105 may be a server cluster, a cloud server, or the like including a plurality of servers. In practical applications, the server includes but is not limited to any hardware device that can perform computing, for example, may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

A user may interact with the server 105 through the network 104 by using the terminal devices 101, 102, and 103, to receive or send messages. The terminal devices 101, 102, 103 may be various electronic devices having display screens, including but not limited to, a smart phone, a tablet computer, a portable computer, a wearable smart device, a smart home device, a desktop computer, or the like.

The server 105 may be a server that provides various services. For example, the server 105 may receive a data resource transfer request transmitted by a target service object (or a user or a service target) through the terminal device 101 (may alternatively be the terminal devices 102 and 103), the data resource transfer request including a target data resource type, an original data resource type, and a target data resource transfer amount. The server 105 can determine an original data resource transfer amount according to the target data resource transfer amount; transmit the data resource transfer request to a target service provider object (or a service provider); obtain response information in response to the data resource transfer request from the target service provider object, the response information including an actual deduction amount of the original data resource type; and obtain an equity amount of the original data resource type according to the target data resource transfer amount and the actual deduction amount. The server 105 can further perform amount transfers between a first-type system account of the target service object, a second-type system account of the target service provider object, and a system equity account according to the equity amount, the original data resource transfer amount, the actual deduction amount, and the target data resource transfer amount.

Figure 2:
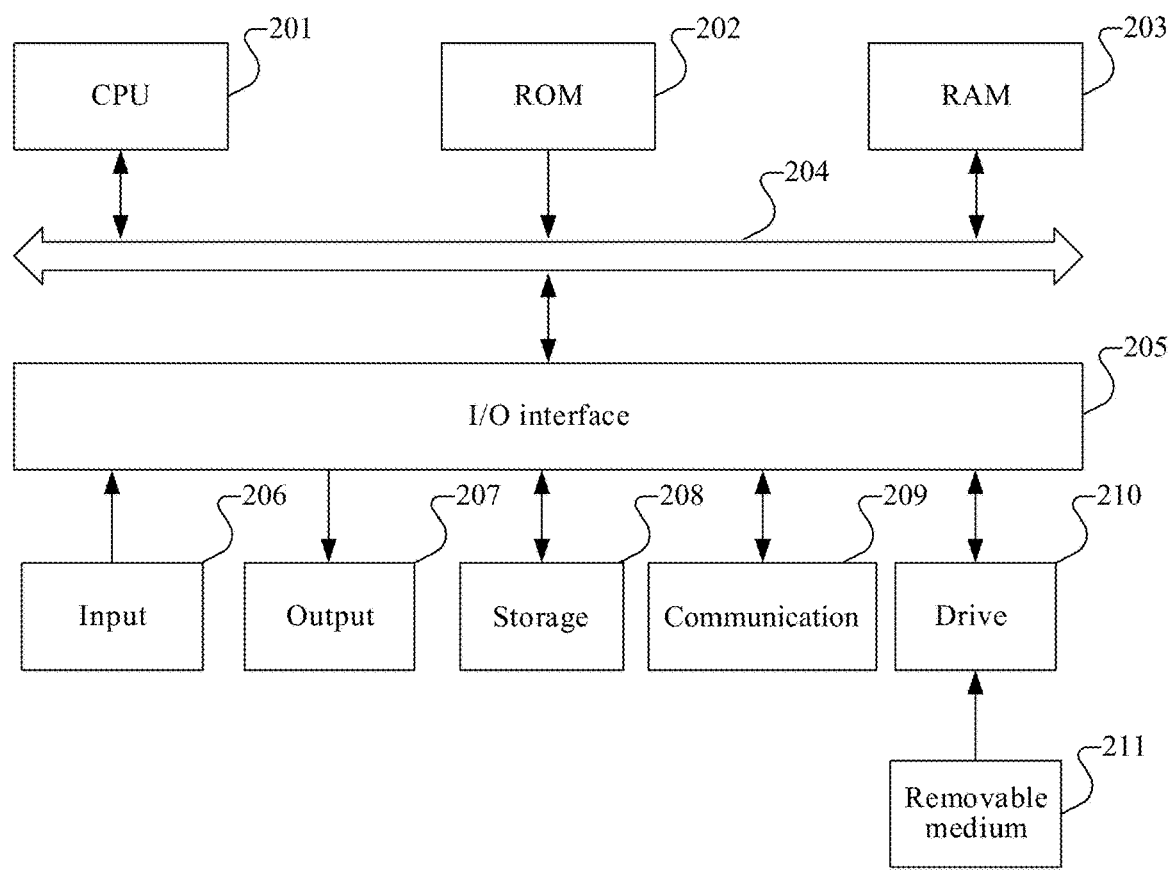
FIG. 2 is a block diagram of an electronic device according to an embodiment of this application.

FIG. 2 is a block diagram of an electronic device (e.g., a computer system) according to an embodiment of this application.

The computer system 200 shown in FIG. 2 is merely an example, and does not constitute any limitation on functions and use ranges of the embodiments of this application.

As shown in FIG. 2, the computer system 200 includes a central processing unit (CPU) 201. The CPU 201 may perform various appropriate actions and processing according to a program stored in a read-only memory (ROM) 202 or a program loaded from a storage portion 208 into a random access memory (RAM) 203. The RAM 203 further stores various programs and data required for system operations. The CPU 201, the ROM 202, and the RAM 203 are connected to each other through a bus 204. An input/output (I/O) interface 205 is also connected to the bus 204.

The following members are connected to the I/O interface 205: an input part 206 including a keyboard, a mouse, and the like; an output part 207 including, such as, a cathode ray tube (CRT), a liquid crystal display (LCD), and a speaker; the storage part 208 including a hard disk or the like; and a communication part 209 including a network interface card such as an LAN card and a modem. The communication part 209 performs communication processing by using a network such as the Internet. A storage medium drive 210 is also connected to the I/O interface 205 as needed. A removable medium 211, such as a magnetic disk, an optical disc, a magneto-optical disk, or a semiconductor memory, is removable installed on the storage medium drive 210 as required, so that a computer program read from the removable medium is installed into the storage part 208.

Particularly, according to one or more embodiments of this application, the processes described in the following by referring to the flowcharts may be implemented as computer software programs. For example, the embodiments of this application include a computer program product, the computer program product includes a computer program carried on a storage medium, and the computer program includes program codes (or instructions) configured to cause processing circuitry (such as the CPU 201) to perform the methods shown in the flowcharts. In such an embodiment, the computer program may be downloaded from a network via the communication part 209 and installed, and/or installed from the removable medium 211. When the computer program is executed by the CPU 201, the various functions defined in the system of this application are executed.

The computer storage medium described in this application may include a computer storage signal medium or a non-transitory computer storage medium or any combination thereof. The computer storage medium may be, for example, but is not limited to, an electric, magnetic, optical, electromagnetic, infrared, or semi-conductive system, apparatus, or component, or any combination thereof. The computer storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In this application, the non-transitory computer storage medium may be any tangible medium including or storing a program, and the program may be used by or in combination with an instruction execution system, apparatus, or device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer signal medium may alternatively be any computer-readable medium other than the computer storage medium. The computer medium may send, propagate, or transmit a program used by or in combination with an instruction execution system, apparatus, or device. Program code embodied on the computer medium may be transmitted using any appropriate medium, including, but not limited to, wireless, wire, optical cable, radio frequency (RF) media, and the like, or any suitable combination of the foregoing.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions configured to implement designated logic functions. In some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction. Of course, it should be understood that one or more of the modules described in this disclosure can be implemented by hardware, for example, circuitry.

Related units described in the embodiments of this application may be implemented in a software manner, or may be implemented in a hardware manner, and the unit described can also be set in a processor. Names of the units do not constitute a limitation on the units in a specific case.

An embodiment of this application further provides a non-transitory computer storage medium. The non-transitory computer storage medium may be included in the electronic device described in the foregoing embodiments, or may exist alone and is not disposed in the electronic device. The non-transitory computer storage medium carries one or more programs, the one or more programs, when executed by the electronic device, causing the electronic device to implement the method described in the following embodiments. For example, the electronic device may implement steps shown in FIG. 3, FIG. 8, FIG. 9, FIG. 10, FIG. 11, FIG. 12, FIG. 13, FIG. 14, FIG. 15, FIG. 17, or FIG. 18.

First, terms involved in various embodiments of this application are explained.

Currency exchange is a process of exchanging account funds from one currency (such as RMB) to another currency (such as US dollars).

Foreign currency payment is a process in which a financial institution approved to operate a foreign currency service, after reviewing, according to management regulations on foreign currency sales and payment, prescribed valid certificates and commercial documents provided by a foreign currency unit and an individual, transfers funds from a foreign currency account of the financial institution or a foreign currency purchased by the financial institution to another, overseas bank account.

A currency exchange platform is a system that provides currency exchange services for clients. The following methods provided in the embodiments of this application may be implemented and performed by the currency exchange platform.

A client is an object (or user, entity, or target) that the currency exchange platform serves, so the client may alternatively be referred to as a "service object" (or "service target") in various embodiments of this application, which can be an internal business party (such as a cross-border purchaser or overseas game, etc.), or an external merchant (such as an import and export trade service provider, etc.). An account balance of a client represents a balance kept by the client in the currency exchange platform system, and represents a liability of the currency exchange platform in accounting.

A channel, which may also be referred to as a bank channel or a downstream channel, is a downstream service provider connected to the currency exchange platform, and therefore, may also be referred to as a "service provider object" (or a "service provider") in various embodiments of this application. Because the currency exchange platform does not have enough foreign currency funds, it may be necessary to complete a currency exchange by using a downstream bank channel. The currency exchange platform acts as an agent of the client and submits a currency exchange request to the downstream channel. The channel is usually a bank (such as XX Bank), or may be a foreign currency trade service provider. In the following examples, descriptions are made by using banks as an example, but this application is not actually limited thereto. An account balance of a channel represents a deposit balance kept by the currency exchange platform as a main body in each downstream channel, and represents assets of the currency exchange platform in accounting.

A physical account, a physical fund, and a physical fund flow respectively represent an account opened by the currency exchange platform in a bank and a balance and a balance change in the account.

A system account, a system fund, and a system fund flow respectively represent an account recorded in a currency exchange platform system and a balance and a balance change in the account. For a bank account, there is a one-to-one correspondence between the physical fund flow and the system fund flow. For example, if a balance of a custodial account of the currency exchange platform in XX Bank increases by RMB 100, an account balance of the XX Bank recorded in a system also increases by RMB 100.

Fund settlement: A process of fund delivery through a transfer of an account balance by related parties involved in foreign currency trades inside the currency exchange platform system. In the process of fund settlement, it is necessary to strictly comply with a basic principle of accounting "a debit is sure to bring about a credit and their amounts are always the same".

Basic exchange rate: A cost exchange rate estimated by the currency exchange platform when the currency exchange platform receives a currency exchange request of a client.

Fixed income: In a process of a currency exchange, an income brought by the currency exchange platform marking up an exchange rate of a client or charging a client an additional handling fee.

Floating profit or loss is a floating profit or floating loss caused by a difference between an actual trade price of the downstream channel and a benchmark price of the platform due to exchange rate fluctuations.

Advance funding: When an account balance of a client on the currency exchange platform is insufficient, the currency exchange platform conducts a trade for the client by using its own fund. In this case, it is equivalent to the client generating a loan on the currency exchange platform.

Account reconciliation: When the client makes up the account balance in a manner such as topping up, the system initiates account reconciliation, which is equivalent to that the client "repays money" to the currency exchange platform.

An advance funding intermediate account: A type of system account. When the balance of the client is insufficient, and there is a need for advance funding, funds are paid from the advance funding intermediate account and are deposited into the account of the client.

In the related art, there are few descriptions of an underlying account system, a fund settlement manner, and fund flow of foreign currency trades. Next, in most of the related account systems of foreign currency trade systems, the client is required to have a sufficient balance before the client initiates a trade. This actually limits the flexibility of the service and fails to create a convenient usage environment for the client.

Figure 3:
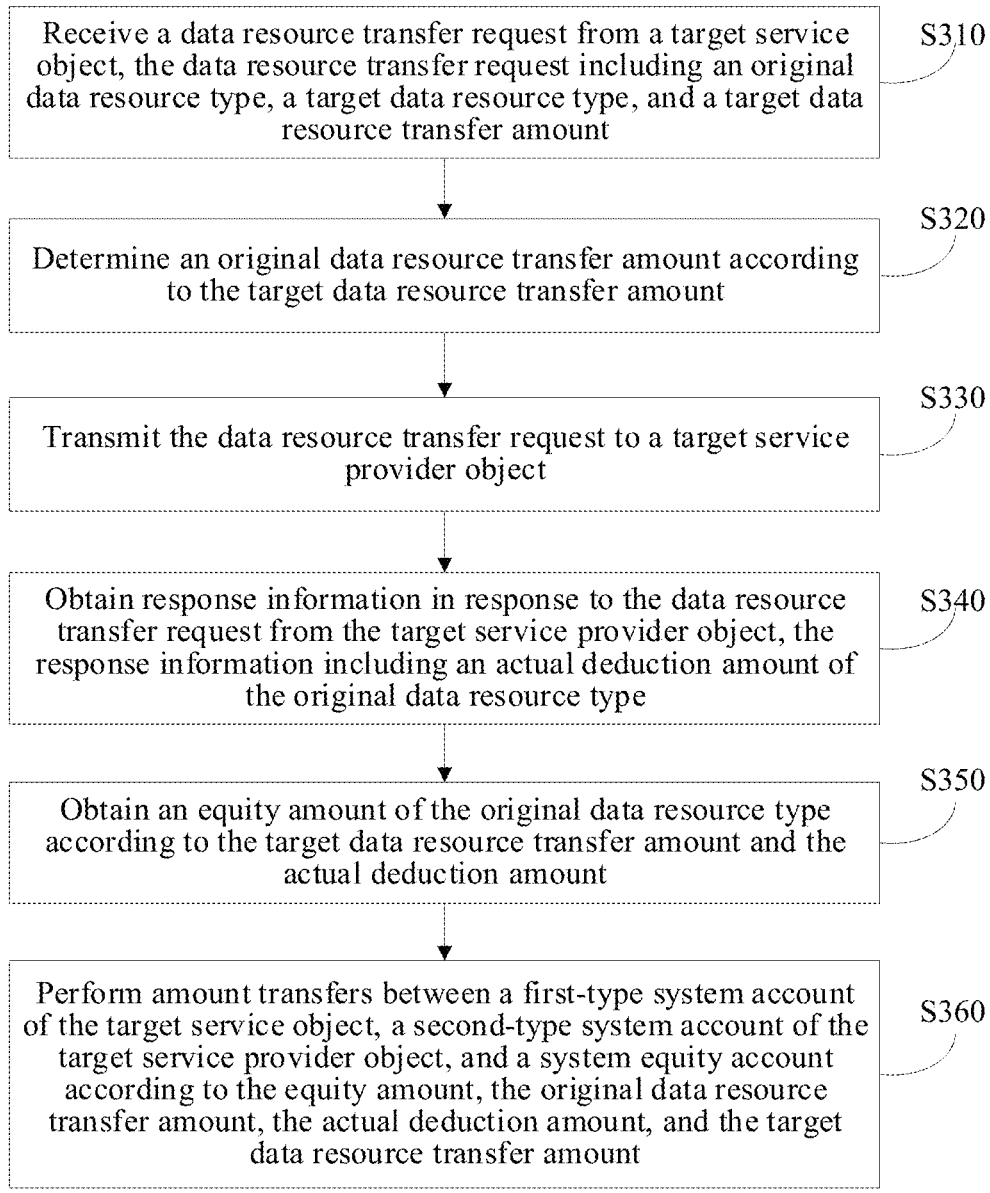
FIG. 3 is a flowchart of a data resource processing method according to an embodiment of this application.

To resolve the foregoing problems, one or more embodiments of this application provide a data resource processing method. Referring to FIG. 3, the data resource processing method is applicable to the electronic device in the foregoing embodiments. In practical applications, the electronic device may be a terminal or a server, and the method may include steps S310 to S360:

In step S310, the electronic device receives a data resource transfer request from a target service object (or a service target), the data resource transfer request including a target data resource type, an original data resource type, and a target data resource transfer amount.

In some embodiments, the target service object may be any client, merchant, or user that submits a data resource transfer request. Relative to an internal system of a currency exchange platform provided in this embodiment of this application, the target service object can be considered as an external client, and the external client may initiate a data resource transfer request to the currency exchange platform through any electronic device such as a terminal device. The data resource transfer request herein is described by using a currency exchange request as an example, but this application is not limited thereto.

Using an example in which the data resource transfer request is a currency exchange request, the target data resource type herein can be a type of currency (referred to as "foreign currency") currently specified to be purchased by an external client, the original data resource type can be another type of currency (referred to as "local currency") currently specified by the external client for purchasing the foreign currency, and the target data resource transfer amount may be a specified foreign currency amount to be purchased by the external client. For example, if the external client specifies to use a balance in an RMB account of the external client to buy USD 100, then the RMB is the local currency, the USD is the foreign currency, and the USD 100 is the target data resource transfer amount.

Figure 22:
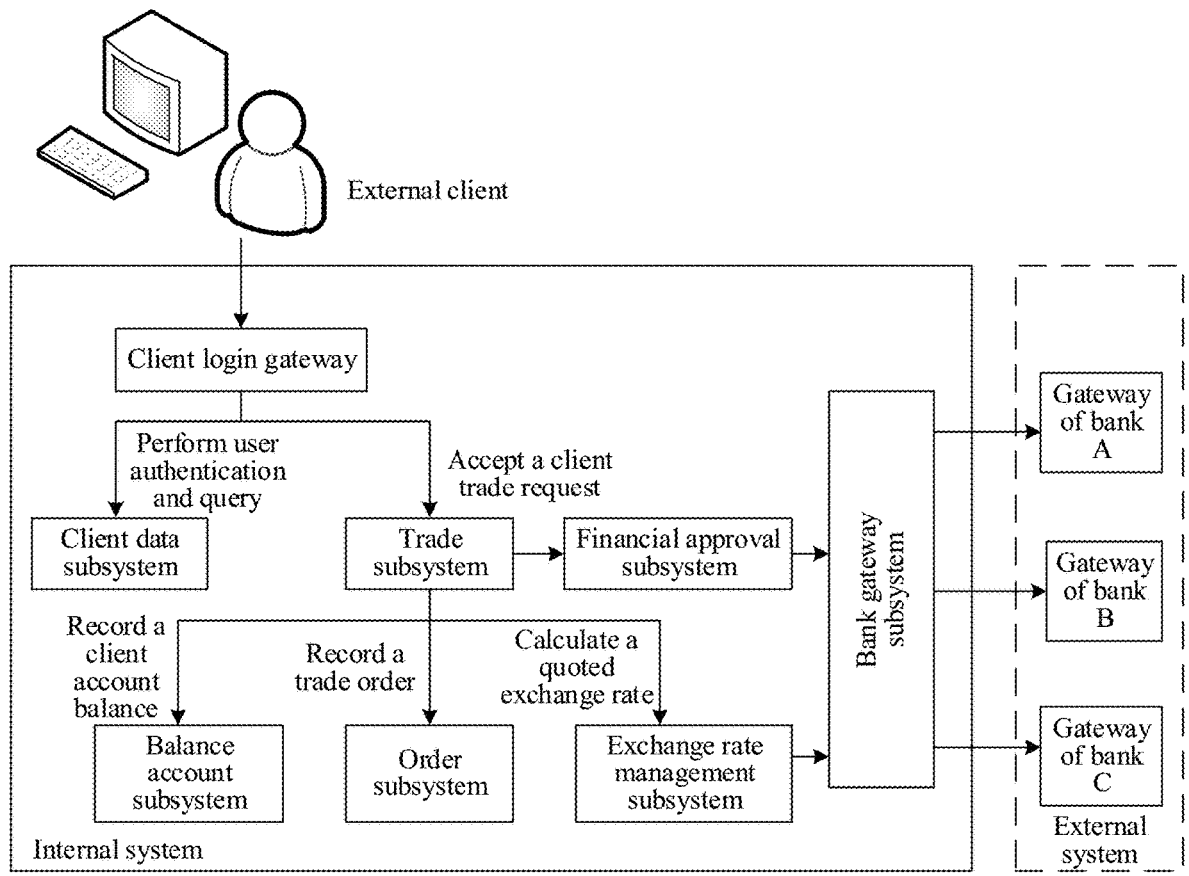
FIG. 22 is a block diagram of system software according to an embodiment of this application.
Figure 23:
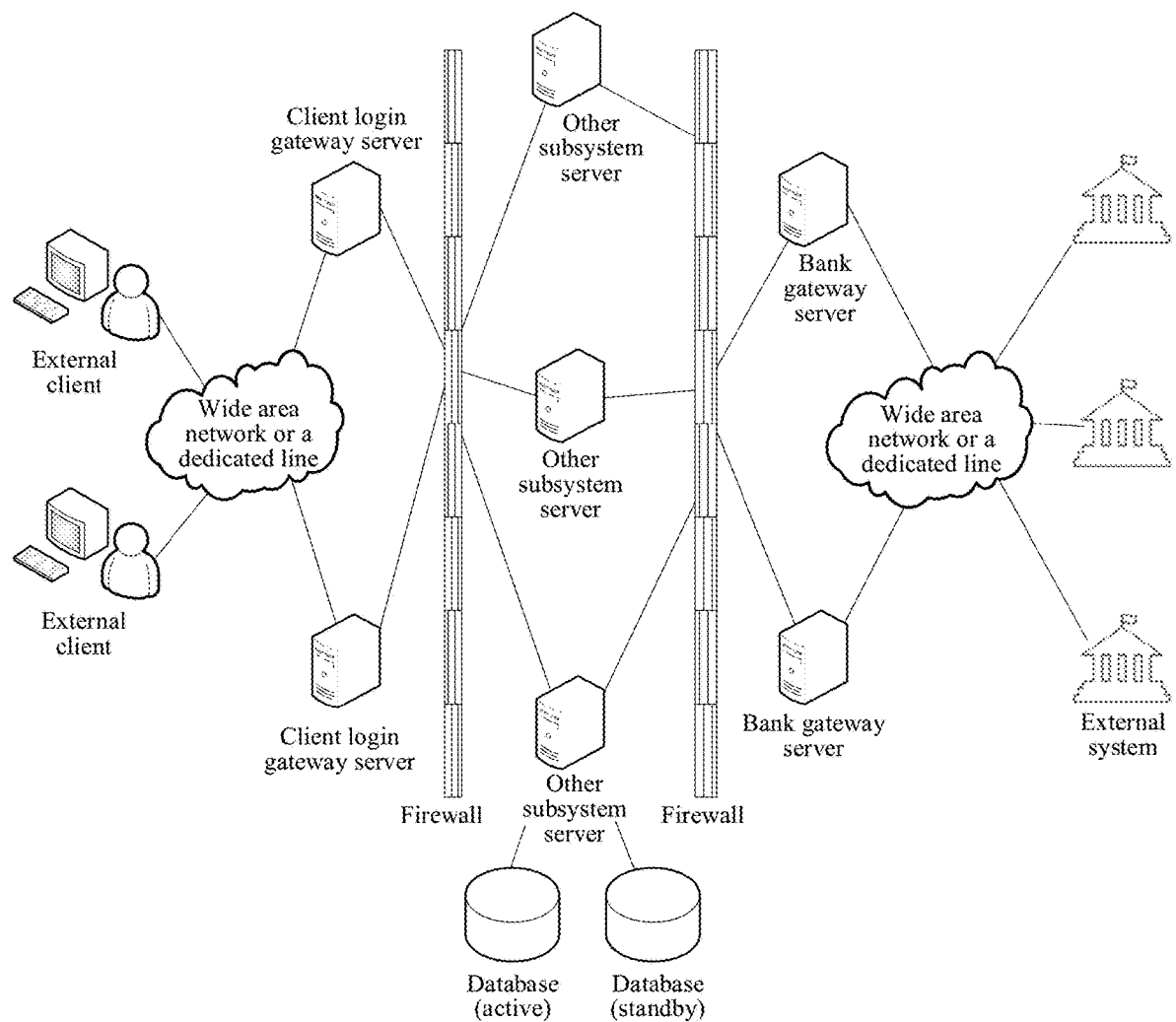
FIG. 23 is a schematic diagram of system hardware according to an embodiment of this application.

Descriptions are provided herein by referring to schematic diagrams of software and hardware systems of the currency exchange platform in FIG. 22 and FIG. 23. The currency exchange platform system mainly includes seven subsystems: a client login gateway subsystem, a client data subsystem, an order trade subsystem, a balance account subsystem, an exchange rate management subsystem, a financial approval subsystem, and a bank gateway subsystem.

Referring to FIG. 22, in some embodiments, the client login gateway subsystem can provide a plurality of forms of access, including: an application programming interface (API) mode, a webpage login mode, etc., so as to meet the needs of different clients. The API interface mode can be provided to a client with a specific technical capability. The system of the client can be directly connected to the currency exchange platform to implement foreign currency trades, implement automation of a trade process, and reduce labor input. The webpage login mode can be provided to a client without a technical development capability. The financial or management personnel of the client log in to the currency exchange platform through a webpage to implement foreign currency trades, and initiate a trade request such as a foreign currency purchase request or a currency exchange request.

Referring to FIG. 22, in some embodiments, the client login gateway subsystem is a module provided by the currency exchange platform system, and is mainly responsible for the following tasks: performing identity authentication on the client, which is performing authentication on identity information, login information, and the like of the client by calling the client data subsystem, to prevent an unregistered user or an unauthorized user from logging in to a subsystem; and accepting and responding to a request of the client, which is accepting a trade request, such as a foreign currency purchase request or a currency exchange request, of the client by calling a trade subsystem, and returning an acceptance result.

Referring to FIG. 22, in some embodiments, the client login gateway subsystem may further be responsible for offloading and intercepting network traffic. When the currency exchange platform is implemented in a distributed structure, a large quantity of concurrent trade requests can be offloaded to different servers through offloading to reduce a load of the server; and when traffic is abnormal and exceeds an overall load of the system, the traffic is intercepted to prevent the traffic from entering a back-end subsystem and overwhelming the entire system.

Referring to FIG. 23, in some embodiments, the currency exchange platform system may be of a distributed structure as a whole. The foregoing subsystems can be deployed on a plurality of servers. For example, the client login gateway subsystem can be deployed on a plurality of client login gateway servers. The client data subsystem, the order trade subsystem, the balance account subsystem, the exchange rate management subsystem, and the financial approval subsystem may also be deployed on a plurality of other subsystem servers, and the bank gateway subsystem may also be deployed on a plurality of bank gateway servers, so as to improve system performance and enhance system robustness. The client login gateway server is deployed in a distributed manner with multi-point access, and thus provides the client with nearby access, offloads the client's request, reduces the pressure of the server, improves a speed of responding to the client, and reduces the latency. The external client and an external bank are related parties connected to the currency exchange platform, and do not belong to the currency exchange platform system in some embodiments.

Although FIG. 23 only shows two client login gateway servers, three other subsystem servers, and two bank gateway servers, only presented as non-limiting examples, in fact, a quantity of client login gateway servers, a quantity of other subsystem servers, and a quantity of bank gateway servers can be adjusted according to the situation for deployment, which is not limited in this application.

Referring to FIG. 23, in some embodiments, the external client may access the currency exchange platform system with an access device to submit a currency exchange request. The access device may include any electronic device such as a server, a personal computer, and a mobile phone. The server can be used to access the currency exchange platform system in the API interface mode, and is generally used by an institution with specific technical development capabilities; and the personal computer or the mobile phone can be used to access the currency exchange platform system in the webpage login mode, and is generally used by an enterprise or an individual without a technical development capability.

Referring to FIG. 23, in some embodiments, the access device of the external client may be connected to a client login gateway server of the currency exchange platform system through a wide area network (WAN) or a dedicated line. During access in the webpage login mode, the WAN can be used. A web front-end (installed on the access device) and a back-end server (including the client login gateway server) may implement various security mechanisms for the currency exchange request transmitted by the client, for example, including an information encryption mechanism. For example, information in the currency exchange request and information in the response result returned to the external client can be encrypted through the hyper text transfer protocol over SecureSocket Layer (HTTPS) technology to prevent information leakage. In a signature mechanism, the currency exchange request and the response result are signed through a negotiated signature key to prevent tampering and denial.

Referring to FIG. 23, in some embodiments, a WAN or a dedicated line may be adopted for the access in the API interface mode. When the WAN is used, the same security mechanism as the webpage login mode can be used. When the dedicated line is configured for access, the following mechanisms can be used to enhance security. In one example, IP whitelist mechanism can be used. Because when the dedicated line is configured for access, an IP address of an access device of the client is generally fixed, which is equivalent to an identity attribute feature of a client, the IP whitelist mechanism can be used. When a back-end server of the currency exchange platform system finds that a request transmitted by the client is inconsistent with an IP whitelist bound by the client, the back-end server rejects the request of the client. In another example, two-way authentication mechanism can be used. Both parties perform authentication on each other using certificates. The back-end server of the currency exchange platform system can purchase a certificate from a trusted root certificate issuance authority to prove the identity thereof. A client certificate can be generated and issued to the client by the currency exchange platform system, and the client can prove the identity thereof by using the client certificate. In yet another embodiment, an information encryption and signature mechanism of the webpage login mode may alternatively be used to strengthen security.

Still referring to FIG. 23, a firewall can further be used to classify each server as an extra-domain server and an intra-domain server. The extra-domain server may be connected to the intra-domain server through the firewall, and the firewall is responsible for detection and interception of traffic passing through the firewall, thereby improving the overall security of the system. In the whole system, the client login gateway subsystem and the bank gateway subsystem can belong to an extra domain and are directly connected to the outside. Other subsystems (the client profile subsystem, the trade subsystem, the order subsystem, the balance account subsystem, etc.) can belong to an intra domain.

Still referring to FIG. 23, In some embodiments, subsystem modules such as a client data subsystem, a trade subsystem, an order subsystem, and a balance account subsystem can be deployed on the subsystem server in the intra domain. A subsystem with a large access amount and high CPU consumption (for example, a balance account subsystem) can be deployed independently (that is, only one subsystem is deployed on one server). A subsystem with a small access amount and low resource consumption (for example, client data subsystem) can be deployed in a mixed manner (that is, a plurality of subsystems are deployed on one server), so as to make better use of server resources and save hardware costs.

In step S320, an original data resource transfer amount is determined according to the target data resource transfer amount.

In an exemplary embodiment, the determining an original data resource transfer amount according to the target data resource transfer amount can include: obtaining a benchmark indicator between the target data resource type and the original data resource type; generating a quotation indicator between the target data resource type and the original data resource type according to the benchmark indicator; determining the original data resource transfer amount according to the quotation indicator and the target data resource transfer amount; and freezing the original data resource transfer amount in a first-type system account of the original data resource type of the target service object.

Still using the currency exchange request as an example, the benchmark indicator can be a basic exchange rate. That is, a basic exchange rate between the local currency and the foreign currency is obtained, and then, the currency exchange platform system can add points to the basic exchange rate. For example, the basic exchange rate is 6.8, and a set number of added points is 0.1, then a quotation indicator (also referred to as a quoted exchange rate) provided to the client is 6.9. According to the quoted exchange rate and an amount of the foreign currency specified to be purchased, such as USD 100, it can be calculated that the original data resource transfer amount is RMB 690, which is a local currency amount payable by the client. The above can be implemented by using the exchange rate management subsystem in FIG. 22. The exchange rate management subsystem is mainly responsible for the following tasks: regularly (or periodically) obtaining reference exchange rates of banks through bank interfaces, and calculating a basic exchange rate of the currency exchange platform using specific calculation rules (for example, the calculation rules, such as the averages, the medians, the weighted averages, the maximums, and the minimums, of all banks); and calculating, in a case that a client transmits a currency exchange request, a quoted exchange rate for the client based on the basic exchange rate of the platform according to a markup rule configured by the system for the client; and monitoring bank exchange rate exceptions: discovering an abnormal situation of a reference exchange rate of a bank from exchange rate differences between different banks at the same time and exchange rate fluctuations of the same bank at different times, to prevent an abnormal exchange rate from being entered into the system and further affecting the generation of the basic exchange rate of the platform.

The markup rule can be the addition of points as described above or addition of percentages. Different clients may be set to share a same fixed markup rule. In some embodiments, for different clients, different markup rules may be configured according to the different clients, for example, configured by comprehensively considering the credit ratings, historical cumulative exchange amounts, etc. of the clients.

In one embodiment of this application, a first-type system account may be a liability account, and a second-type system account corresponding to the first-type system account may be an asset account. After the local currency amount payable by the client is determined, the local currency amount payable by the client, for example, RMB 690, of the client in the liability account corresponding to the local currency, such as RMB, can be frozen.

For example, the trade subsystem in FIG. 22 is responsible for processing the trade request, such as the currency exchange request, of the client. The processing procedure is as follows: After receiving the currency exchange request transmitted by the client, the trade subsystem calls a relevant interface of the exchange rate management subsystem, calculates the exchange rate quoted to the client, and calculates the corresponding local currency payable by the client, that is, a local currency deduction amount, according to a specified amount of the foreign currency to be purchased by the client, that is, a foreign currency amount of a foreign currency purchase. Afterwards, the trade subsystem calls the order subsystem to generate an order, calls the balance account subsystem to freeze the local currency balance equal to the local currency amount payable by the client of the client, and after the acceptance succeeds, return quotation information (including the quoted exchange rate and the local currency deduction amount) to the client. The process corresponds to an initiation stage of a foreign currency purchase.

In an exemplary embodiment, before the freezing the original data resource transfer amount in a first-type system account of the original data resource type of the target service object, the method may further include: obtaining a remaining amount in the first-type system account of the original data resource type of the target service object; and transferring the original data resource transfer amount from a first-type system account of the original data resource type of a system intermediate account to the first-type system account of the original data resource type of the target service object in a case that the remaining amount is less than the original data resource transfer amount.

For example, when a remaining amount (also referred to as an account balance) in the liability account of the client corresponding to the local currency is less than the local currency amount payable by the client, by using a solution of this embodiment of this application, money equal to the local currency amount payable by the client can be transferred from the liability account corresponding to the local currency of a system intermediate account (also referred to as an "advance funding intermediate account") provided by the foreign currency platform system to the liability account corresponding to the local currency of the client.

In an exemplary embodiment, the method may further include: transferring the original data resource transfer amount from a second-type system account of the original data resource type of the system intermediate account to a second-type system account of the original data resource type of the target service object. Reference may be made to the following embodiments related to advance funding.

In an exemplary embodiment, the obtaining a remaining amount in the first-type system account of the original data resource type of the target service object may include: obtaining an external number of the target service object; looking up in a client account association table of the target service object according to the external number, to obtain the first-type system account of the original data resource type of the target service object; and looking up in an account balance table of the target service object according to the first-type system account of the original data resource type of the target service object, to obtain the remaining amount in the first-type system account of the original data resource type of the target service object. For the implementation, reference can be made to the embodiments of FIG. 8 and FIG. 9 described below.

In some embodiments, the balance account subsystem in FIG. 22 is responsible for recording balance information and flow information of each account (including an account balance table of each account) in the system. The accounts herein may include various types of accounts mentioned in this embodiment of this application, including a bank account, an asset account of a client, a liability account of the client, a fixed income account, a floating profit or loss account, an advance funding intermediate account, and the like.

In an exemplary embodiment, the method may further include: determining a current data resource type, the current data resource type including the target data resource type and the original data resource type; querying the client account association table of the target service object according to the current data resource type; generating a first-type system account and a second-type system account that correspond to the current type in a case that the first-type system account and the second-type system account that correspond to the current data resource type do not exist in the client account association table; and writing the first-type system account and the second-type system account that correspond to the current data resource type into the client account association table.

In one embodiment of this application, the current data resource type may include any currency in a client account (including a liability account and an asset account) specified to be opened by the target service object in a corresponding currency as required. Reference can be made to the embodiment in FIG. 9 below.

For example, a client profile subsystem in FIG. 22 can be responsible for basic functions such as client registration and identity authentication, and maintaining client profile information (such as client basic information) and client account association information (such as a client account association table). As a basic service, the client information subsystem provides other subsystems with interfaces for client information management, login authentication management, account registration, and the like.

In an exemplary embodiment, the method may further include: querying the account balance table of the target service object according to the current data resource type; and writing the first-type system account and the second-type system account that correspond to the current data resource type into the account balance table in a case that the first-type system account and the second-type system account that correspond to the current data resource type do not exist in the account balance table.

In an exemplary embodiment, the method may further include: generating the external number of the target service object; generating an internal number of the target service object corresponding to the external number; and writing the external number and the internal number into the client account association table of the target service object.

In step S330, the data resource transfer request is transmitted to a target service provider object (or a service provider).

In step S340, response information in response to the data resource transfer request is obtained from the target service provider object, the response information including an actual deduction amount of the original data resource type.

Referring to FIG. 22, the bank gateway subsystem is responsible for connecting to various bank channels, transmitting a request, such as a data resource transfer request, from the trade subsystem to the bank, and returning the response information of the bank to the trade subsystem.

In an exemplary implementation, the trade subsystem transmits the trade order of the client to the corresponding bank through the bank gateway subsystem, and the bank returns a foreign currency purchase result as response information to the currency exchange platform system. The returned response information may include information such as an actual trade exchange rate and an actual trade amount (that is, the actual deduction amount).

Generally, different banking systems can be quite different. For example, some banks interact in the form of interfaces, and some banks interact in the form of documents. The same type of interaction also faces differences in interface parameters or file formats. As being adapted to bank channels, the bank gateway subsystem shields bank differences for an internal trade subsystem and provides a unified process, which makes the logic of the internal trade subsystem clearer and more concise, and facilitates system maintenance and upgrade.

Referring to FIG. 23, in some embodiments, the bank gateway subsystem can be deployed on the bank gateway server. The intra-domain server is connected to an extra-domain bank gateway server through the firewall, and then the bank gateway server is connected to a system of an external bank through the WAN or the dedicated line. For a security mechanism for interaction between the bank gateway server and an external bank server, a solution similar to the access device of the external client and the client login gateway server can be used to ensure the security of the interaction between both parties.

In step S350, an equity amount of the original data resource type is obtained according to the target data resource transfer amount and the actual deduction amount.

In an exemplary embodiment, the equity amount may include a fixed income and a floating profit or loss.

The obtaining an equity amount of the original data resource type according to the target data resource transfer amount and the actual deduction amount may include: obtaining a quoted amount according to the target data resource transfer amount and the quotation indicator; obtaining a benchmark amount according to the target data resource transfer amount and the benchmark indicator; obtaining a fixed income of the original data resource type according to the quoted amount and the benchmark amount; and obtaining a floating profit or loss of the original data resource type according to the actual deduction amount and the benchmark amount.

In one embodiment of this application, the quoted amount may be equal to a product of an amount of a foreign currency specified to be purchased and the quoted exchange rate. The benchmark amount may be equal to a product of an amount of a foreign currency specified to be purchased and a basic exchange rate. A difference between the quoted amount and the benchmark amount may be used as a fixed income of the local currency. A difference between the benchmark amount and an actual trade amount returned by the bank may be used as floating profit or loss of the local currency.

In step S360, amount transfers between a first-type system account of the target service object, a second-type system account of the target service provider object, and a system equity account are performed according to the equity amount, the original data resource transfer amount, the actual deduction amount, and the target data resource transfer amount.

In an exemplary embodiment, the system equity account may include a fixed income account and a floating profit or loss account. The performing amount transfers between a first-type system account of the target service object, a second-type system account of the target service provider object, and a system equity account according to the equity amount, the original data resource transfer amount, the actual deduction amount, and the target data resource transfer amount may include: unfreezing the original data resource transfer amount in the first-type system account of the original data resource type of the target service object; transferring the fixed income from the first-type system account of the original data resource type of the target service object to a fixed income account of the original data resource type; transferring the floating profit or loss from the first-type system account of the original data resource type of the target service object to a floating profit or loss account of the original data resource type; transferring the actual deduction amount from the first-type system account of the original data resource type of the target service object to a second-type system account of the original data resource type of the target service provider object; and transferring the target data resource transfer amount from a second-type system account of the target data resource type of the target service provider object to a first-type system account of the target data resource type of the target service object.

In one embodiment of this application, the trade subsystem may calculate the fixed income and the floating profit or loss according to an exchange rate quoted by the exchange rate management subsystem to the client and an actual trade amount of the bank returned by the bank gateway subsystem, then call the order subsystem to update order information and status, and call the balance account subsystem to complete balance addition and subtraction operations of a client account (including the first-type system account of the target service object), a bank account (corresponding to the second-type system account of the target service provider), and an equity account (corresponding to the system equity account). This process corresponds to a foreign currency repurchase stage.

Referring to FIG. 22, in some embodiments, the accounting approval subsystem is responsible for an approval process of a foreign currency purchase, and is mainly used by financial personnel. Due to a high fund risk involved in a monetary operation such as the foreign currency purchase, to avoid risks, such as an amount error, caused by a manual error or a system error, financial personnel need to approve an exchange request submitted to the bank, and then transmit the exchange request to the bank after approval.

In the data resource processing method provided in the embodiments of this application, when receiving a data resource transfer request from a target service object, a system can automatically determine an original data resource transfer amount according to a target data resource transfer amount carried in the data resource transfer request, obtain response information for the data resource transfer request, and determine an equity amount according to the original data resource transfer amount and an actual deduction amount carried in the response information, so as to perform amount transfers between various system accounts of the target service object, a target service provider object, and the like according to the equity amount, the original data resource transfer amount, the actual deduction amount, and the target data resource transfer amount. Accordingly, a calculation amount can be small, fewer system resources are occupied, a running speed can be fast, and the data resource transfer request from the target service object can be timely and accurately responded to. On the other hand, a user only needs to submit a data resource transfer request through one click or tap, and the system can automatically complete the amount transfers between various system accounts. When the system is applied to a foreign currency trade scenario, an automatic and intelligent foreign currency service is implemented.

The method provided in the embodiments of this application is described below with reference to FIG. 4 to FIG. 25, but this application is not limited thereto.

In one or more embodiments of this application, a foreign currency trade underlying account system that supports a plurality of currencies and can advance funding and a fund settlement solution are created. Firstly, each client can open accounts in a plurality of currencies on the currency exchange platform to record balance information of each currency of the client and establish a foundation for the client to carry out the currency exchange. Secondly, in one or more embodiments of this application, an advance funding and account reconciliation solution based on a dual, liability+arrears account is designed, allowing the client to submit a trade request when an account balance is insufficient, and reconcile the account when a balance is sufficient. Thirdly, in one or more embodiments of this application, a double-entry bookkeeping method in accounting is used to perform fund settlement, ensuring a clear and verifiable fund flow of a system account and the security of account funds.

The double-entry bookkeeping method means that occurrence of any economic trade may cause at least two items of assets and liabilities to increase or decrease, and an amount of increase is equal to an amount of decrease. Therefore, when each economic trade is reflected, the economic trade is to be registered simultaneously in at least two relevant accounts in an equal amount. Such a method of registering each economic trade that occurs in two or more related accounts in an equal amount is referred to as the double-entry bookkeeping method. Therefore, for the occurrence of each economic trade, the same amount can be double recorded in an equal amount in two or more related accounts. Such a bookkeeping method truthfully reflects an objective relationship between economic items and events and is a scientific bookkeeping method. The bookkeeping method can comprehensively and clearly reflect the ins and outs of the economic trade, and can comprehensively and systematically reflect a process and a result of an economic activity through an increase or decrease of accounting elements.

First, an implementation solution of a system account system is described, mainly including: (1) account classification; (2) key account information; (3) an account association method; (4) an overall legend of an account system; and (5) a flowchart of account creation. As follows:

First, according to the accounting theory, accounts are divided into asset accounts, liability accounts, and owner's equity accounts, and the following accounting principles are followed:

$$\Sigma Asset = \Sigma Liability + \Sigma Owner's\ equity \quad (1)$$

The owner's equity is a residual equity enjoyed by an owner after liabilities are deducted from assets.

Then, according to an entity corresponding to an account owner, an account can be divided into the following types:

(1.1) Client Account

The client account is created by application of a client. Each client includes the following two accounts in each currency. That is, each client includes both a first-type system account and a second-type system account in each currency:

Liability account: The liability account saves the balance information of the client in the currency exchange platform system. A balance indicates how much the platform "owes" to the client, and therefore, the account is a liability account in accounting.

For example, if a client tops up RMB 100 in the currency exchange platform system, an RMB balance of the corresponding liability account of the client increases by RMB 100.

Asset account: The asset account saves the arrears balance information of the client in the currency exchange platform system. An arrears balance indicates how much the client "owes" to the platform, so the account is an asset account in accounting.

For example, if a client has an insufficient balance in the currency exchange platform system and applies to the currency exchange platform for an advance funding trade of RMB 100, then the RMB balance of the asset account corresponding to the client increases by RMB 100.

In normal trades, the client always uses the liability account of the client for settlement; and only when a balance is insufficient, and advance funding is needed, an account needs to be recorded in the asset account of the client to represent an arrears.

(1.2) Channel account (also referred to as a bank account below): The channel account saves balance information of the currency exchange platform system on a channel side. A balance represents a fund balance of the platform in a bank channel account, so the account is an asset account in accounting. Each channel has one account in each currency. Bank accounts, relative to the currency exchange, are all asset accounts, that is, second-type system accounts.

For example, the system provides a start-up fund of RMB 100 for the currency exchange platform, which is saved in XX Bank, then an RMB balance of XX Bank increases by RMB 100, and RMB 100 is recorded as the assets of the currency exchange platform.

(1.3) Advance funding intermediate account: The advance funding intermediate account is used to record information of the client "borrowing money" through advance funding and "repaying money" through account reconciliation. To meet a principle "amounts of the credit and debit are always the same" in accounting, the advance funding intermediate account needs two accounts in each currency. That is, similar to the client, the advance funding intermediate account simultaneously includes the first-type system account and the second-type system account in each currency:

Liability account: The liability account corresponds to the liability assets of the client. The liability account is for fund settlement of the liability assets of the client in a process of advance funding and account reconciliation.

The asset account corresponds to the asset account of the client. The liability account is for fund settlement of the asset account of the client in a process of advance funding and account reconciliation.

(1.4) Fixed income account: The fixed income account records an income balance brought by a fixed markup by the currency exchange platform. The balance represents a fixed income of the platform. Therefore, the account is an owner's equity account in accounting.

(1.5) Floating profit or loss account: The floating profit or loss account records a floating profit or loss balance caused by an exchange rate fluctuation of the currency exchange platform. The balance represents a floating profit or loss of the platform. Therefore, the account is an owner's equity account in accounting.

In this embodiment of this application, the fixed income account and the floating profit or loss account are collectively referred to as an equity account, but the two can actually be separate accounts. For the sake of simplification, if the fixed income account and the floating profit or loss account are regarded as the liability accounts of the currency exchange platform, that is, the first-type system accounts, then the foregoing formula (1) can be simplified into the following formula:

$$\Sigma Asset = \Sigma Liability \quad (2)$$

Therefore, there are accounts in the system as shown in Table 1 below:

TABLE 1

System account

| Account name | Accounting type | Account usage |
|---|---|---|
| XX Bank | Asset | Record a balance of a bank channel |
| YY client | Liability | Record a balance of a client |
| | Asset | Record an arrears balance of a client |
| Fixed income account | Owner's equity | Record an income balance brought by a fixed markup by a currency exchange platform |
| Floating profit or loss account | Owner's equity | Record a floating profit or loss balance caused by an exchange rate fluctuation of a currency exchange platform |
| Advance funding intermediate account | Liability | Record fund loan information of liability accounts of clients during advance funding and account reconciliation of all the clients |
| | Asset | Record fund loan information of asset account of clients during advance funding and account reconciliation of all the clients |

There can be a plurality of banks and a plurality of clients in the system (depending on the quantities of banks and clients connected to the system). In some embodiments, only one fixed income account, one floating profit or loss account, and one advance funding intermediate account are provided. That is, for the currency exchange platform system, different clients can share the same fixed income account, the same floating profit or loss account, and the same advance funding intermediate account. The system also supports a plurality of currencies, so that each account can have a separate account in each currency, and each currency account can be separately billed.

Each type of account (the client, channel, or bank account, the advance funding intermediate account, or the equity account) has an account balance table (the equity account includes a fixed income account and a floating profit or loss account, both of which can be classified as a platform income, and the two are independent accounts, each having its own account balance table), each row of records in the table represents a system account, recording a balance of each account in the system, and key information of an account balance is shown in Table 2 below:

TABLE 2

Key account information

| Field name | Field type | Description | Example |
|---|---|---|---|
| acno | Character string | System account of client/channel/equity/intermediate account | 1000001156 |
| accnt_type | Numeric | Account type: 1-Liability 2-Asset | 1 |
| currency | Character string | Currency | CNY |
| num | Numeric | Balance | 100.00 |
| modify_time | Time format | Balance update time | 2000-01-01 00:00:00 |

In Table 2, the intermediate account is an abbreviation of the advance funding intermediate account. CNY stands for RMB, USD stands for U.S. dollar in the following text, and HKD stands for Hong Kong dollar. In accounting, there is a formula "Asset=Liability+Owner's equity". Both the fixed income account and the floating profit or loss account are equity accounts. To simplify the account system, the equity account is regarded as a liability account, that is, the formula is simplified as "Asset=Liability".

In addition, there may further be an account flow table, which is used to record details of each account fund change, and can further be configured for accounting and reconciliation. Every time an account fund is operated and an account balance is modified, a new account flow needs to be added. The account flow table records key elements, such as accounts of both parties, a currency, an amount, a trade type, and a trade time, of the trade, as shown in Table 3 below.

TABLE 3

Account flow table

| Field name | Field type | Description | Example |
|---|---|---|---|
| roll_list | Character string | Flow number | 1234 |
| order_list | Character string | Trade order number | 0001 |
| acno | Character string | Balance account | 9999156 |
| vs_acno | Character string | Counterparty balance account | 1000001156 |
| currency | Character string | Currency | CNY |
| num | Numeric | Amount | 690 |
| direct | Numeric | Loan direction: 1-Borrow, 2-Loan | 1 |
| trade_type | Array | Transaction type, for example: 1-advance funding for foreign currency purchase, 2-freezing for foreign currency purchase, 3-unfreezing for foreign currency purchase, 4-pay-out for foreign currency purchase, 5-pay-in for foreign currency purchase, and 6-account reconciliation for foreign currency purchase . . . | 1 |
| trade_time | Time format | Trade time | 2000-01-01 00:00:00 |

In Table 3 above, a balance account can be a system account of the corresponding account in Table 2 above.

After the foregoing description, an overall account system is described as follows, which can be divided into a client account system, a bank account system, an advance funding intermediate account system, and an owner's equity account system.

Figure 4:
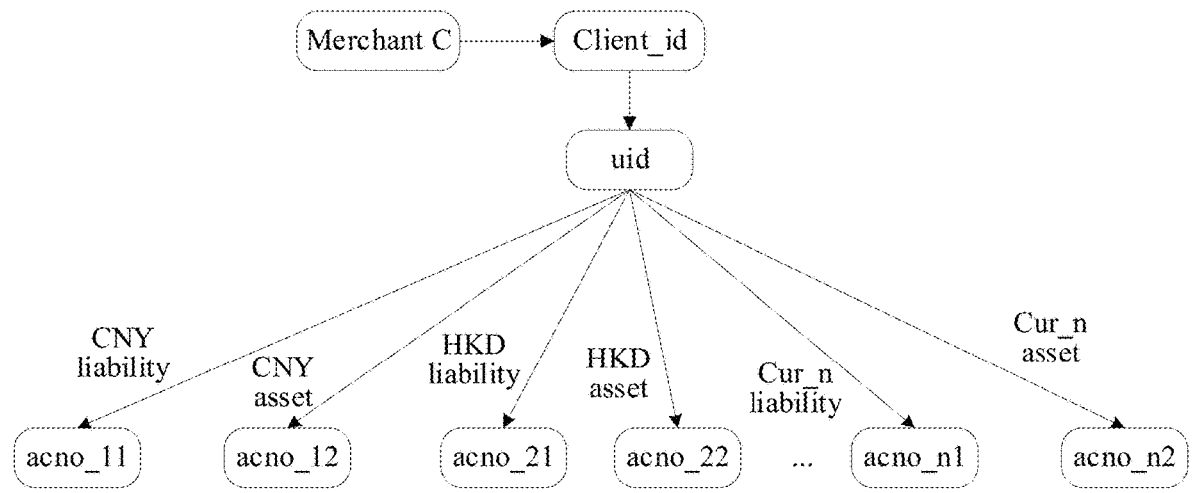
FIG. 4 is a schematic diagram of a client account system according to an embodiment of this application.

FIG. 4 is a schematic diagram of a client account system according to an embodiment of this application.

As shown in FIG. 4, descriptions are made by using an example in which a merchant C is an external client. Each client may open accounts in a plurality of currencies. An external ID of the client is Client_id, and an internal ID uid of the client and the system account are associated with key elements such as a currency. It is assumed that when the merchant C registers a system account, a total of n currencies, such as RMB (CNY), Hong Kong dollar (HKD), . . . and another currency Cur_n are selected for opening the accounts, where n is a positive integer greater than or equal to 1. The system generates system accounts for the currencies, such as a CNY liability account acno_11, a CNY asset account acno_12, an HKD liability account acno_21, an HKD asset account acno_22, a Cur_n liability account acno_n1, and a Cur_n asset account acno_n2.

Figure 5:
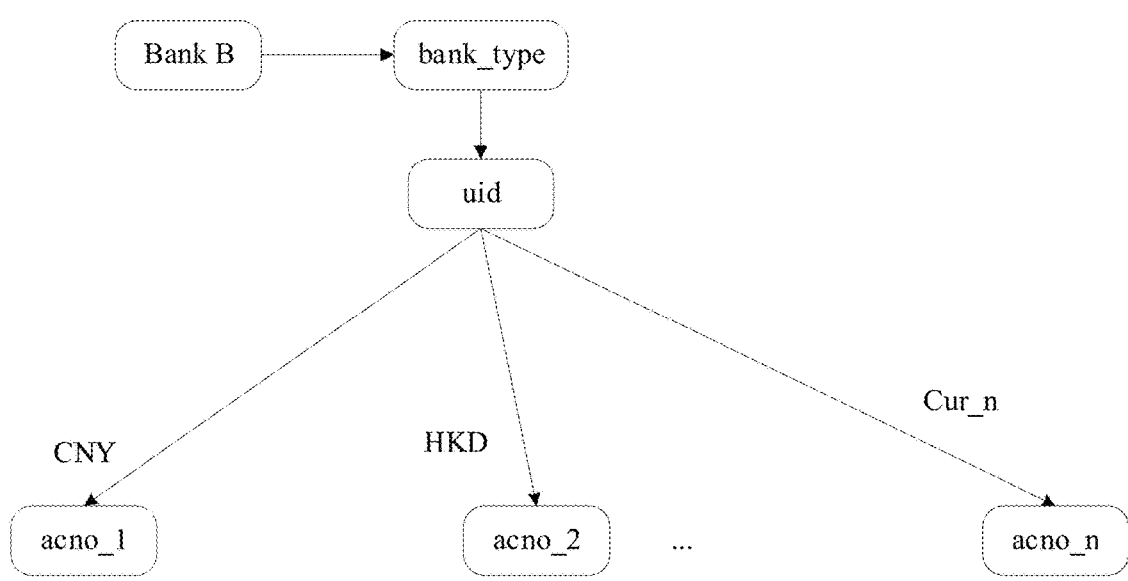
FIG. 5 is a schematic diagram of a bank account system according to an embodiment of this application.

FIG. 5 is a schematic diagram of a bank account system according to an embodiment of this application.

As shown in FIG. 5, a bank account is a downstream channel account. Descriptions are provided herein by using a bank B as an example. Each channel may alternatively open a plurality of currency accounts. An external number bank_type of the bank B and an internal number uid of the bank B are associated with the system account using key elements such as a currency. Still using CNY, HKD, . . . and another currency Cur_n as an example, the system generates system accounts for the currencies, such as a CNY account acno_1, an HKD account acno_2, and a Cur_n account acno_n of the bank B.

Figure 6:
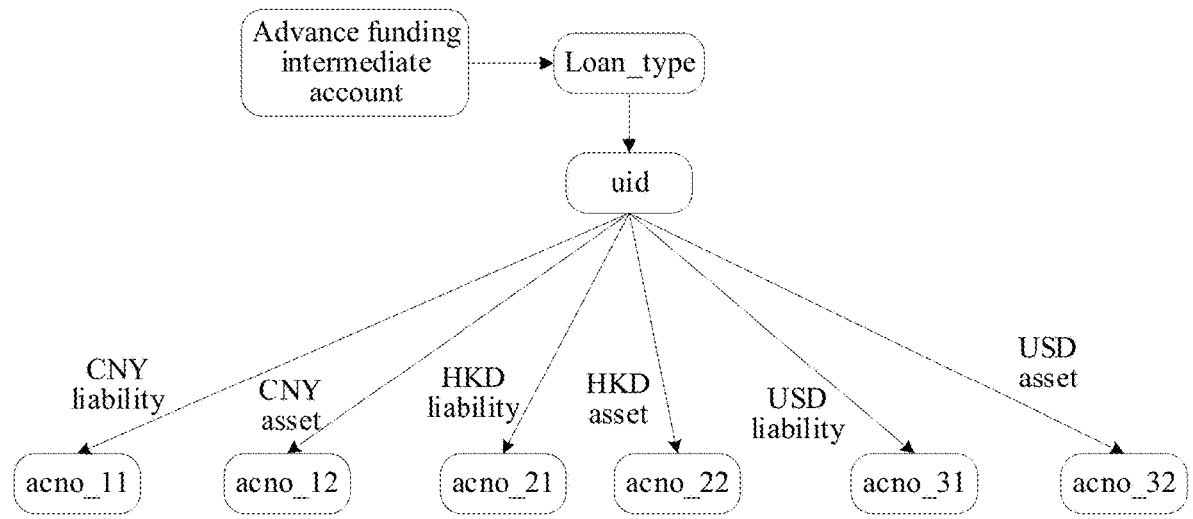
FIG. 6 is a schematic diagram of an advance funding intermediate account system according to an embodiment of this application.

FIG. 6 is a schematic diagram of an advance funding intermediate account system according to an embodiment of this application.

As shown in FIG. 6, the advance funding intermediate account may also open accounts in a plurality of currencies. An external number Loan_type and an internal number uid of the advance funding intermediate account are associated the system account using key elements such as a currency. Descriptions are provided herein by using RMB, HKD, and USD as an example. A CNY liability account acno_11, a CNY asset account acno_12, an HKD liability account acno_21, an HKD asset account acno_22, a USD liability account acno_31, and a USD asset account acno_32 are opened for the advance funding intermediate account.

Figure 7:
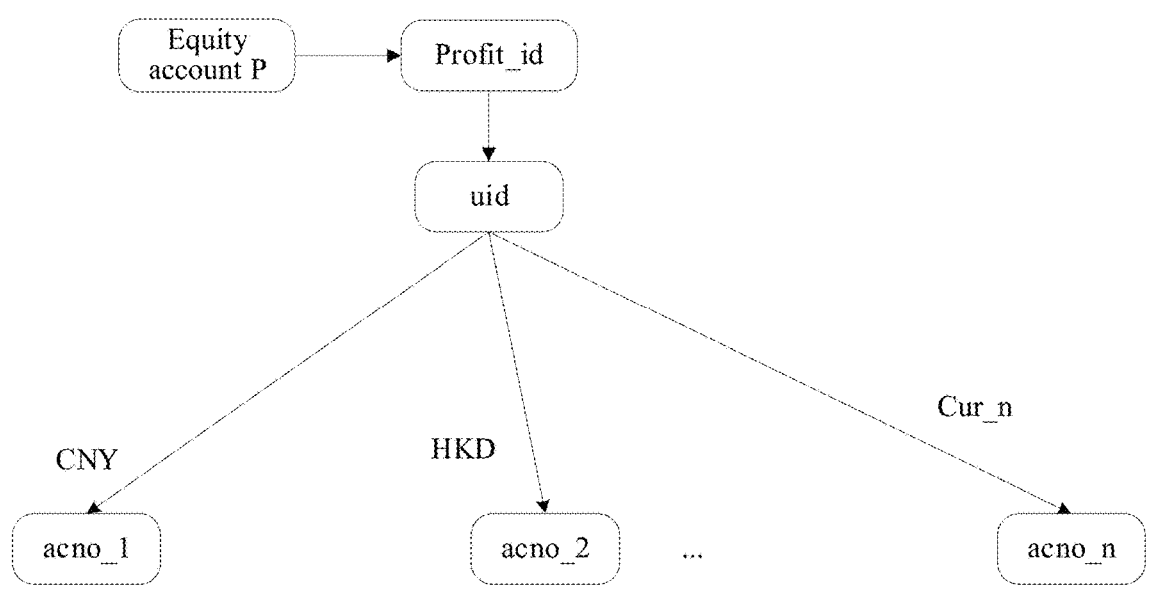
FIG. 7 is a schematic diagram of an equity account system according to an embodiment of this application.

FIG. 7 is a schematic diagram of an equity account system according to an embodiment of this application.

As shown in FIG. 7, an equity account P represents the fixed income account and the floating profit or loss account, both of which have their own accounts. An external ID Profit_id and an internal ID uid of the equity account P are associated with the system account using key elements such as a currency. For example, a CNY account acno_1, an HKD account acno_2, and a Cur_n account acno_n are generated for the equity account P.

The following describes a creation process of each account. A client account, a bank account, an advance funding intermediate account, and an equity account are also distinguished for account creation.

Figure 8:
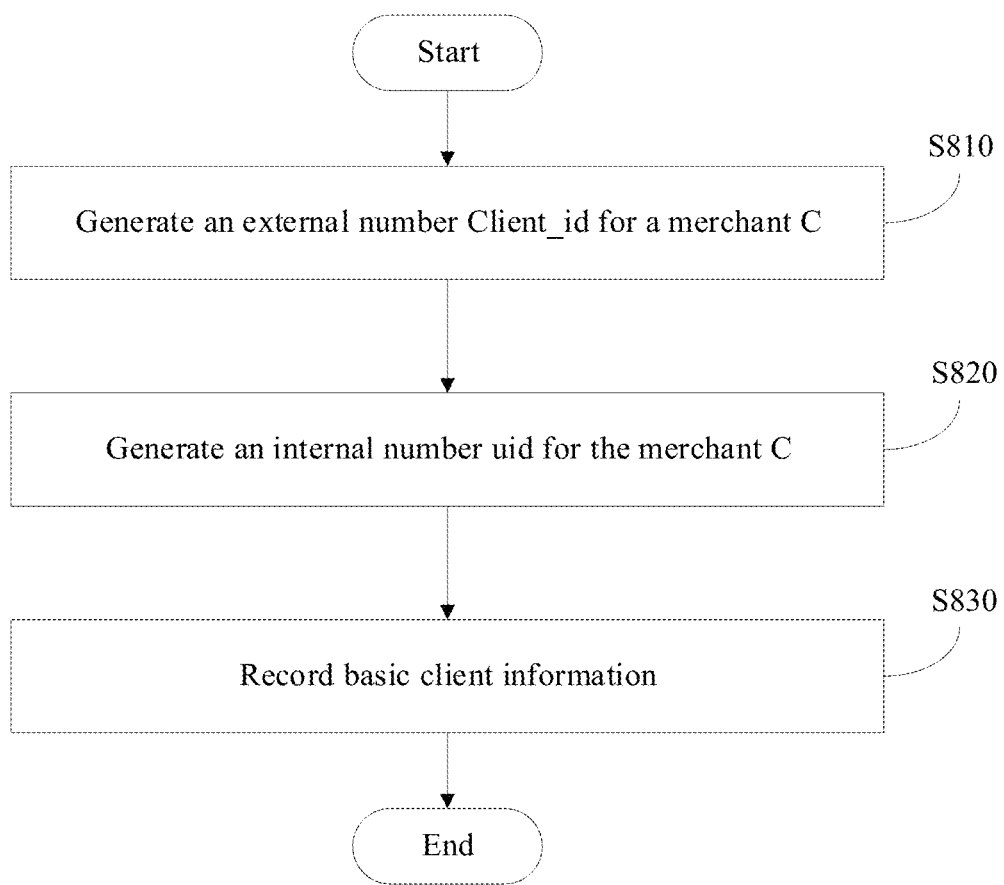
FIG. 8 is a flowchart of creating basic client information according to an embodiment of this application.

FIG. 8 is a flowchart of creating basic client information according to an embodiment of this application. As shown in FIG. 8, in an embodiment of this application, the creating basic client information may include the following steps.

In step S810, an external number Client_id for a merchant C is generated.

In step S820, an internal number uid for the merchant C is generated.

In step S830, basic client information is recorded.

First, whether the merchant C is an individual client or a corporate client needs to be distinguished. If the merchant C is an individual client, the basic client information may include a name, an ID card number, a mobile phone number, a home address, and other similar personal information of the merchant C. If the merchant C is a corporate client, the basic client information may include basic corporate information, such as a corporate name, an address, contact information, corporate legal person information, and the like.

In this embodiment of this application, system accounts in a plurality of currencies can be created for the external client, but the client does not need to record the accounts in a plurality of currencies, to make client management as simple as possible, which is implemented by establishing an association relationship between the client and the system account. For example, for a client M, the following operations are performed:

(1) Allocate an external number Client_id to the client M, the client M logging in using Client_id to query account balance information in the system.

(2) To facilitate internal management, create a client internal number uid for each Client_id, uid being invisible to the client. The external number is directly provided to the external client, and the client logs in to the currency exchange platform system by using the external number. The internal number is configured for an internal record of the currency exchange platform system. The relationship between the two is maintained using a mapping table. Advantages of this are increasing flexibility, and preventing data information of an underlying system from being exposed to the outside, which increases the security.

(3) Finally, manage association relationships between the client and accounts in various currencies by using an association table. For example, key information of a client account association table is shown in Table 4 below:

TABLE 4

| Client account association table | | | |
|---|---|---|---|
| Field name | Field type | Description | Example |
| client_id | Character string | External number of client | Jdong001 |
| uid | Character string | Internal number of client | 1000001 |
| currency | Character string | Currency | CNY |
| accnt_type | Numeric | Account type: 1-Liability 2-Asset | 1 |
| acno | Character string | System account | 1000001156 |

Figure 9:
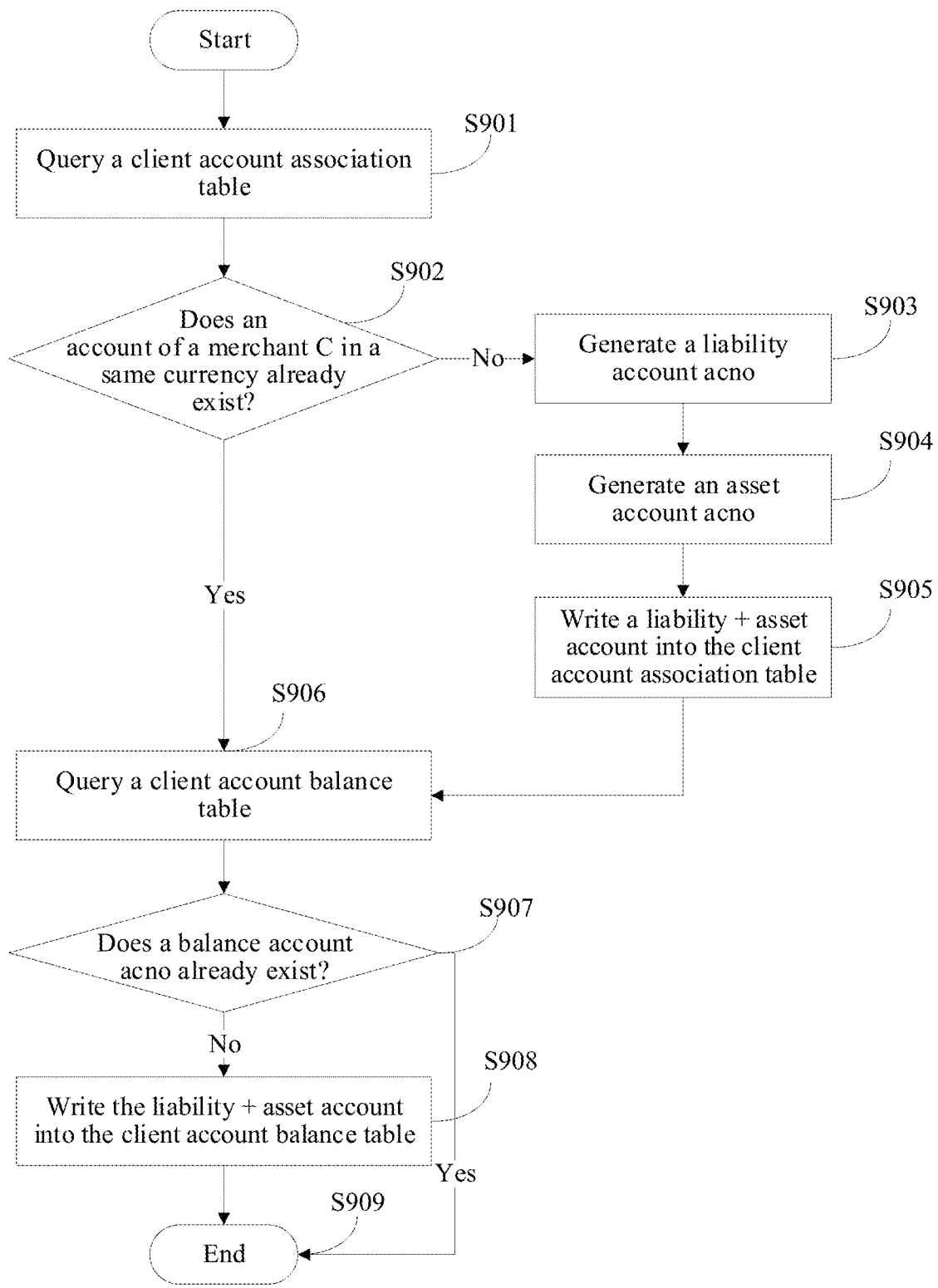
FIG. 9 is a flowchart of creating a balance account of a client according to an embodiment of this application.

FIG. 9 is a flowchart of creating a balance account of a client according to an embodiment of this application. As shown in FIG. 9, the creating a balance account of a client in this embodiment of this application may include the following steps.

In step S901, a client account association table is queried.

First, specific currencies that are specified by the merchant C for account opening are determined first, and then, these currencies are traversed and processed according to steps S901 to S909, and liability accounts and asset accounts corresponding to the currencies in the client account association table of the merchant C are generated one by one.

In step S902, whether an account of the merchant C in a same currency already exists is determined. In a case that the account of the merchant C in the same currency is determined as not existing, proceed to step S903; and if yes, jump to step S906.

In step S903, a liability account acno is generated.

In step S904, an asset account acno is generated.

In step S905, a liability+asset account is written into the client account association table.

Descriptions are provided herein by using any one of the currencies as an example. First, the client account association table is queried to determine whether a liability account and an asset account in the currency already exist in the client account association table of the merchant C. If not, the liability account and the asset account in the currency are generated for the merchant C, and the generated liability account and asset account in the currency are written into the client account association table of the merchant C. If yes, the current operation of the currency is completed.

In step S906, a client account balance table is quarried.

The client account balance table corresponds Table 2 above, and can be a general-purpose table, which can be used by a client account, a fixed income account, a floating profit or loss account, an advance funding intermediate account, and a bank channel account. At a database level, balance tables of different accounts are different tables. Table names are different, but fields of the tables are the same.

In step S907, whether an acno balance account already exists is determined. In a case that the acno balance account is determined as existing, proceed to step S909; and if not, jump to step S908.

In step S908, the liability+asset account is written into the client account balance table.

The generated liability account and asset account of the client in the currency are used as balance accounts in the corresponding currency in the client account balance table. An account association table is used to associate a mapping relationship between an external number Client_id (or an external number bank_type of the bank, etc.) of the client and a balance account acno, and does not record a balance. The account balance table records the balance. An advantage of this is that the system is layered, which facilitates development and maintenance. An association table belongs to a category of client data, and an account balance table belongs to an underlying account system.

Using any client as an example, when the balance of the client is queried, acno is first found using Client_id in the client account association table, and then, a balance of the account is found using acno in the client account balance table.

In step S909, the operation is ended.

Figure 10:
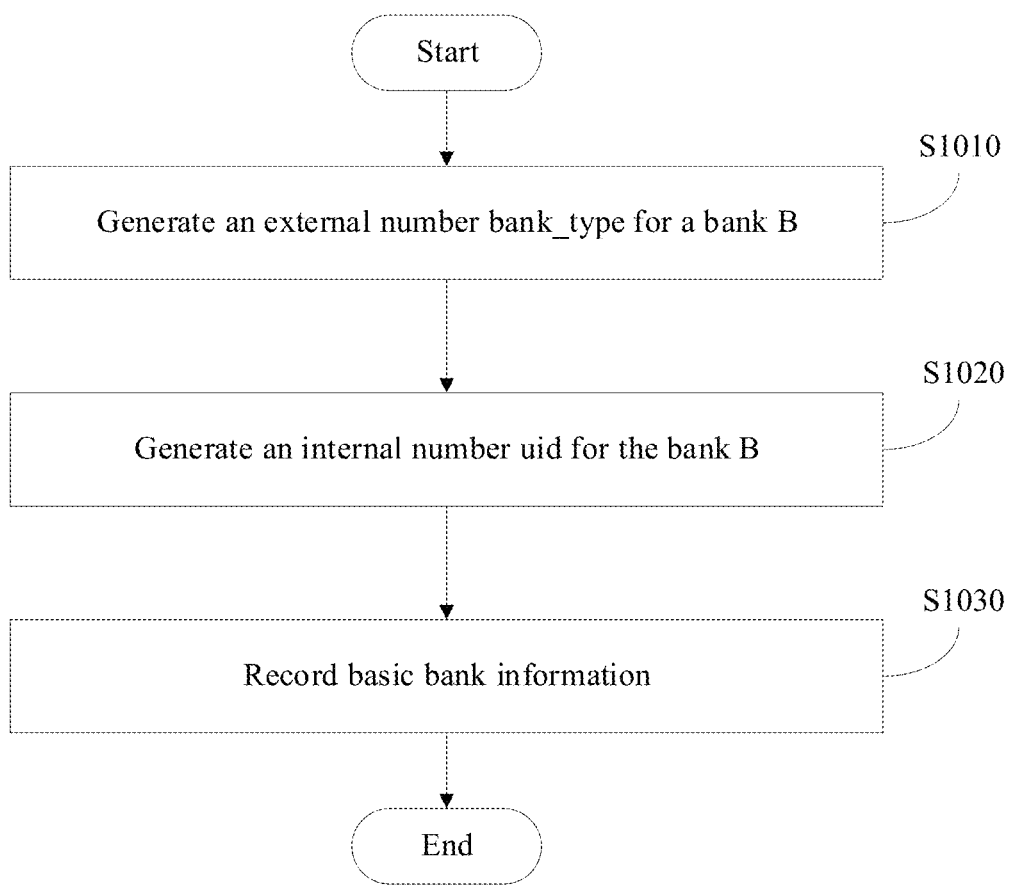
FIG. 10 is a flowchart of creating basic bank information according to an embodiment of this application.

FIG. 10 is a flowchart of creating basic bank information according to an embodiment of this application. As shown in FIG. 10, in an embodiment of this application, the creating basic bank information may include the following steps.

In step S1010, an external number bank_type for a bank B is genera ted.

In step S1020, an internal number uid for the bank B is genera ted.

St In step p S1030, basic bank information is recorded.

The basic bank information may include a bank name, an address, and other similar information.

In addition, associations relationships of accounts of channels in the system are also recorded. An approach includes the following:

(1) Allocate a channel bank external number bank_type to each channel bank, financial personnel distinguishing the banks by using bank_type for account management.

(2) Similarly, to facilitate internal management, creating a bank internal number uid for each bank_type, uid being invisible to the financial personnel.

(3) Finally, manage association relationships between the channel bank and accounts in various currencies using a channel bank account association table. Key information of a channel bank account association table is shown in Table 5 below:

TABLE 5

| Channel bank account association table | | | |
|---|---|---|---|
| Field name | Field type | Description | Example |
| bank_type | Character string | External number of a bank channel | 4598 |

TABLE 5-continued

| Channel bank account association table | | | |
|---|---|---|---|
| Field name | Field type | Description | Example |
| uid | Character string | Internal number of a bank channel | 0004598 |
| currency | Character string | Currency | CNY |
| acno | Character string | System account | 4598156 |

Figure 11:
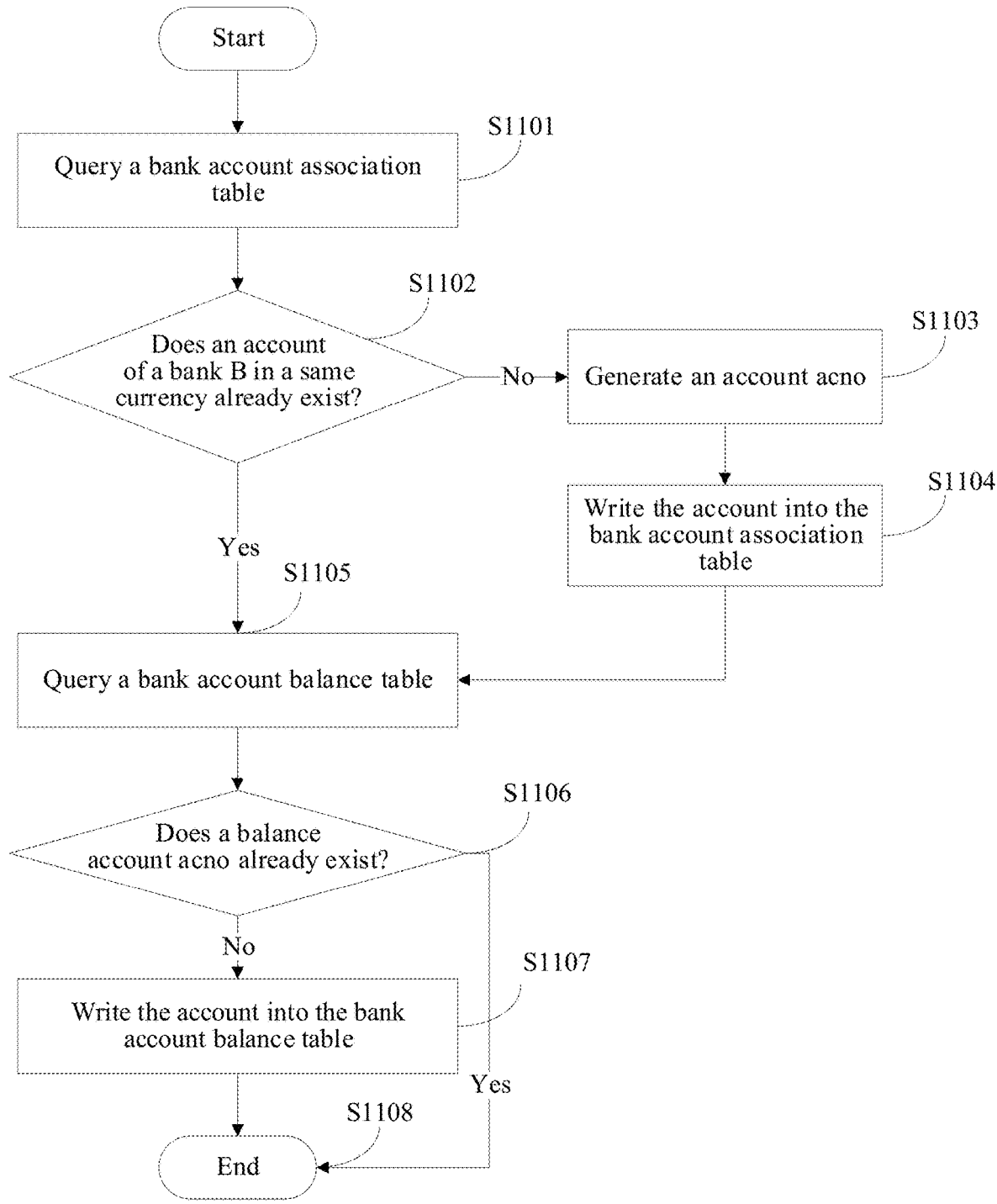
FIG. 11 is a flowchart of creating a bank balance account according to an embodiment of this application.

FIG. 11 is a flowchart of creating a bank balance account according to an embodiment of this application. As shown in FIG. 11, in an embodiment of this application, the creating a bank balance account may include the following steps.

In step S1101, a bank account association table is quarried.

In step S1102, whether an account of the bank B in the same currency already exists is determined. In a case that the account of the bank B in the same currency is determined as not existing, proceed to step S1103; and if yes, jump to step S1105.

In step S1103, an account acno is generated.

In step S1104, the account is written into the bank account association table.

In step S1105, a bank account balance table is quarried.

In step S1106, whether an acno balance account already exists is determined In a case that the acno balance account is determined as existing, proceed to step S1108; and if not, jump to step S1107.

In step S1107, the account is written into the bank account balance table.

In step S1108, the operation is ended.

Figure 12:
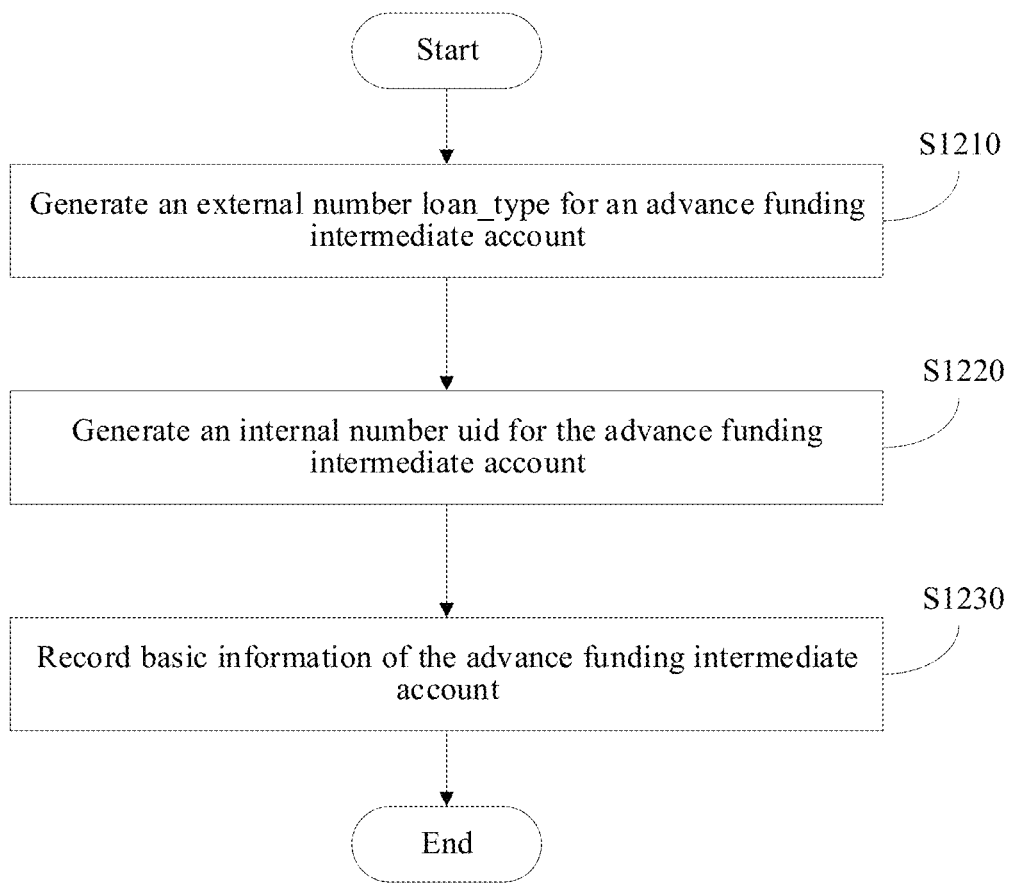
FIG. 12 is a flowchart of creating basic information of an advance funding intermediate account according to an embodiment of this application.

FIG. 12 is a flowchart of creating basic information of an advance funding intermediate account according to an embodiment of this application. As shown in FIG. 12, in an embodiment of this application, the creating basic information of the advance funding intermediate account may include the following steps.

In step S1210, an external number loan_type for the advance funding intermediate account is generated.

In step S1220, an internal number uid for the advance funding intermediate account is generated.

In step S1230, basic information of the advance funding intermediate account is recorded.

The basic information of the intermediate account may include an external number of the intermediate account, usage of the intermediate account, and remark information of the intermediate account.

Finally, in some embodiments, an account for the advance funding intermediate account can be created, and association relationships between the advance funding intermediate account and accounts in various currencies can be recorded. An approach includes the following:

(1) Allocate an external number loan_type to the advance funding intermediate account, financial personnel identifying the advance funding intermediate account by using loan_type for account management.

(2) Similarly, to facilitate internal management, create an advance funding intermediate account internal number uid for each loan_type, uid being invisible to the financial personnel.

(3) Manage association relationships between the advance funding intermediate account and accounts in various currencies using an advance funding intermediate account association table. Key information of the advance funding intermediate account association table is shown in Table 6 below:

TABLE 6

Advance funding intermediate account association table

| Field name | Field type | Description | Example |
|---|---|---|---|
| loan_type | Character string | External number of advance funding intermediate account | 9999 |
| uid | Character string | Internal number of advance funding intermediate account | 0009999 |
| currency | Character string | Currency | CNY |
| accnt_type | Numeric | Account type: 1-Liability 2-Asset | 1 |
| acno | Character string | System account | 9999156 |

Figure 13:
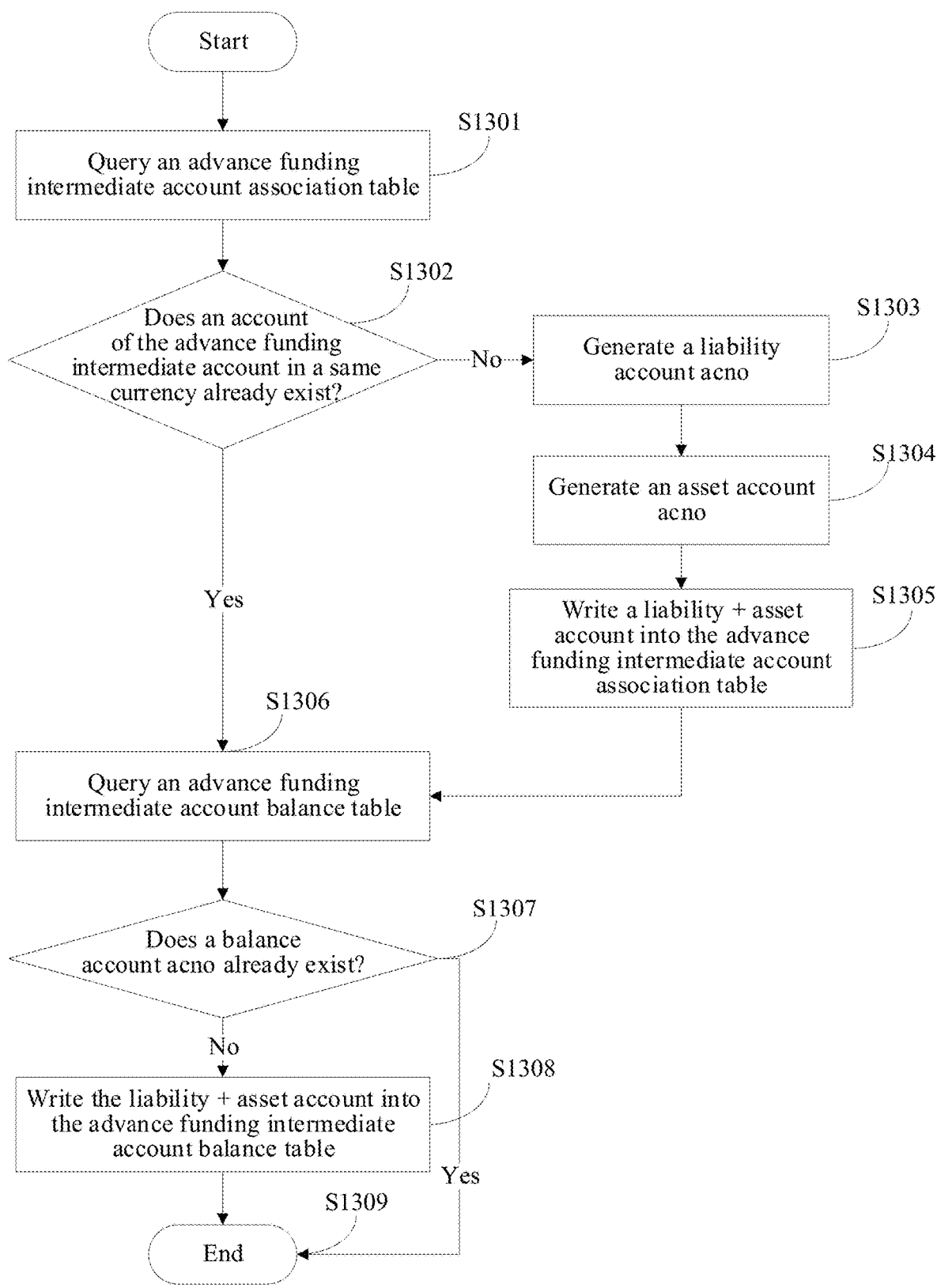
FIG. 13 is a flowchart of creating a balance account of an advance funding intermediate account according to an embodiment of this application.

FIG. 13 is a flowchart of creating a balance account of an advance funding intermediate account according to an embodiment of this application. As shown in FIG. 13, in an embodiment of this application, the creating a balance account of an advance funding intermediate account may include the following steps.

In step S1301, an advance funding intermediate account association table is quarried.

In step S1302, whether an account of the advance funding intermediate account in the same currency already exists is determined. In a case that the advance funding intermediate account in the same currency is determined as not existing, proceed to step S1303; and if yes, jump to step S1306.

In step S1303, a liability account acno is generated.

In step S1304, an asset account acno is generated.

In step S1305, a liability+asset account is written into the advance funding intermediate account association table.

In step S1306, an advance funding intermediate account balance table is quarried.

In step S1307, whether an acno balance account already exists is determined. In a case that the acno balance account is determined as existing, jump to step S1309; and if not, proceed to step S1308.

In step S1308, the liability+asset account is written into the advance funding intermediate account balance table.

In step S1309, the operation is ended.

Figure 14:
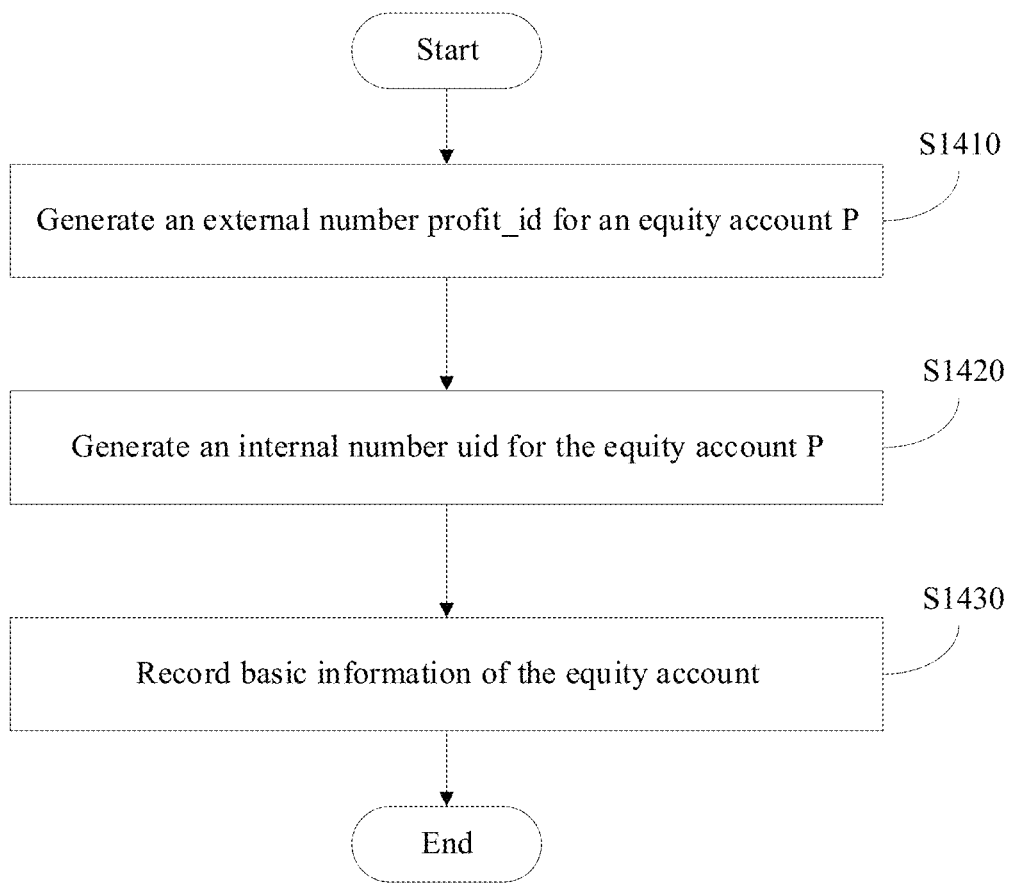
FIG. 14 is a flowchart of creating basic client information of an equity account according to an embodiment of this application.

FIG. 14 is a flowchart of creating basic information of an equity account according to an embodiment of this application. As shown in FIG. 14, in an embodiment of this application, the creating basic information of the equity account may include the following steps.

In step S1410, an external number profit_id for an equity account P is generated.

In step S1420, an internal number uid for the equity account P is generated.

In step S1430, basic information of the equity account is recorded.

The basic equity information may include remarks such as the external number and the internal number of the equity account, an equity account type (fixed income account or floating profit or loss account), and account usage.

Then, association relationships between the equity account and accounts in various currencies are record. Key information of an equity account association table is shown in Table 7 below:

TABLE 7

Equity account association table

| Field name | Field type | Description | Example |
|---|---|---|---|
| profit_id | Character string | External number of equity account | gushou6666 |
| uid | Character string | Internal number of equity account | 6666 |
| currency | Character string | Currency | CNY |
| acno | Character string | System account | 6666156 |

In Table 7 above, the fixed income account and the floating profit or loss account are independent and can be distinguished by using profit_id.

Figure 15:
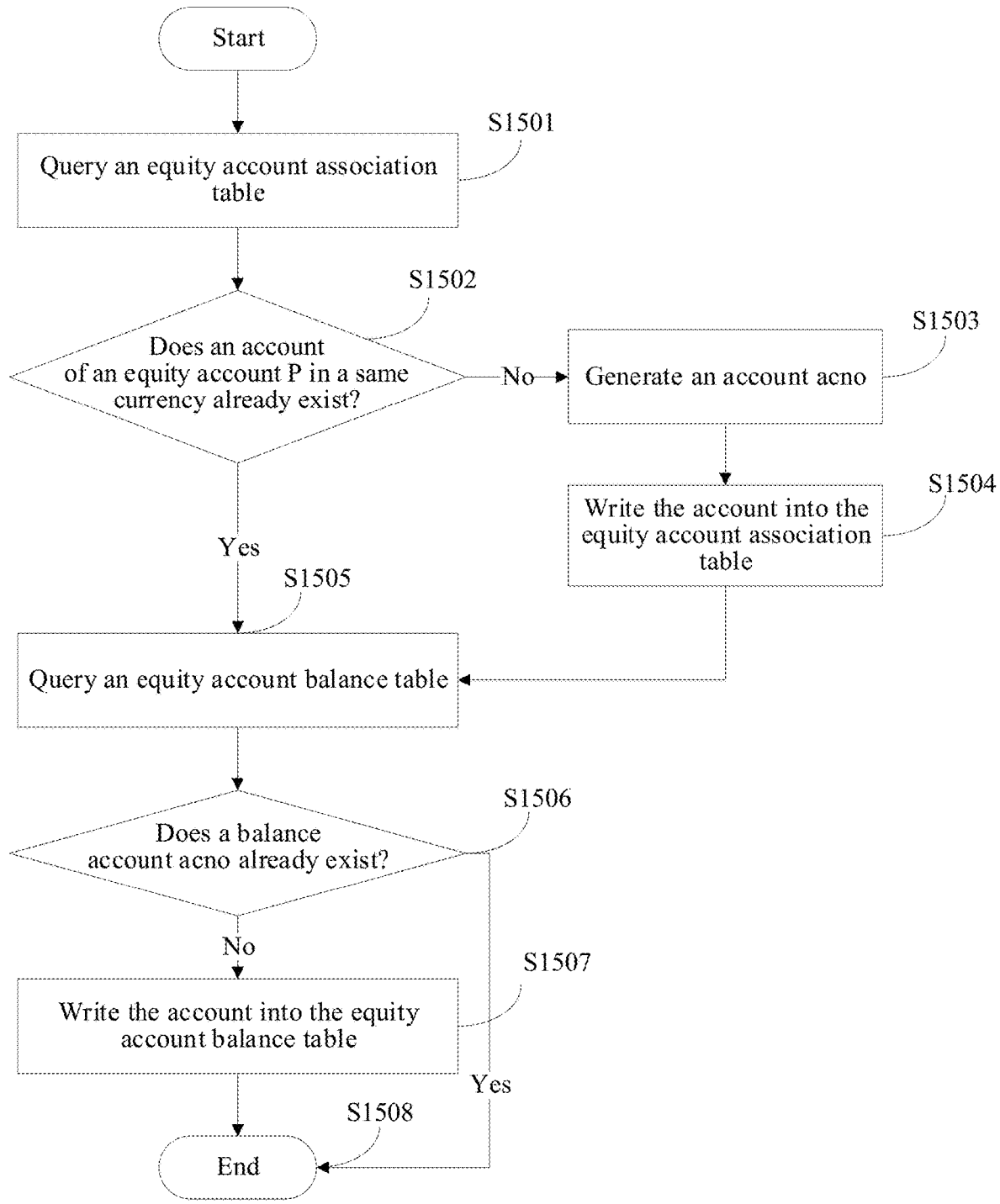
FIG. 15 is a flowchart of creating a balance account of an equity account according to an embodiment of this application.

FIG. 15 is a flowchart of creating a balance account of an equity account according to an embodiment of this application. As shown in FIG. 15, in an embodiment of this application, the creating a balance account of an equity account may include the following steps.

In step S1501, an equity account association table is quarried.

In step S1502, whether an account of the equity account Pin the same currency already exists is determined. In a case that the account of the equity account P in the same currency is determined as not existing, proceed to step S1503; and if yes, jump to step S1505.

In step S1503, an account acno is generated.

In step S1504, the account is written into the equity account association table.

In step S1505, an equity account balance table is quarried.

In step S1506, whether a balance account of acno already exists is determined. In a case that the balance account of acno is determined as existing, jump to step S1508; and if not, proceed to step S1507.

In step S1507, the account is written into the equity account balance table.

In step S1508, the operation is ended.

In many scenarios, when a balance of the client is insufficient, the advance funding intermediate account needs to "lend money" to the client. Therefore, it may be necessary to record advance funding arrears of each client. Finally, it is also necessary to return the money borrowed by the client from the advance funding intermediate account. Therefore, an account reconciliation procedure may also be required. A process of advance funding account reconciliation can be not only applied to a foreign currency trade platform such as the currency exchange platform, but also broadened into a general-purpose solution, so that the process can be used in various service scenarios (such as foreign currency purchase in an advance funding manner, foreign currency payment, ordinary loans, etc.).

In the foregoing account system design, a dual-account solution is designed. An asset account of a client records the arrears balance of the client, and a liability account of the client records the tradable balance of the client. The asset account of the client is similar to an overdraft amount/a credit card balance/a loan balance, while the liability account of the client is equivalent to a debit card balance/a balance in a third-party payment wallet.

When there is a need for advance funding, money is paid from an asset account of the advance funding intermediate account to the asset account of the client; and money is paid from a liability account of the advance funding intermediate account to the liability account of the client. For each account, an amount of pay-out is equal to an amount of pay-in.

Figure 16A:
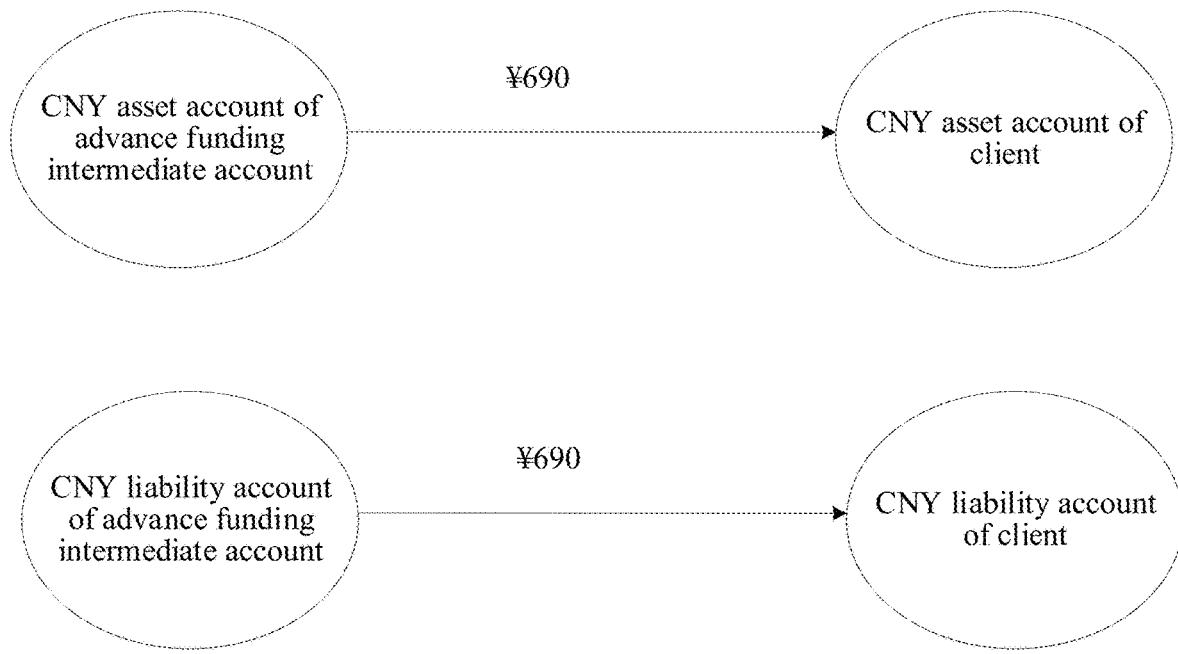
FIG. 16A is a schematic diagram of an advance funding fund flow according to an embodiment of this application.

For example, as shown in FIG. 16A, the asset account of the advance funding intermediate account in the CNY currency lends ¥690 to the asset account of the client in the CNY currency. In addition, the liability account of the advance funding intermediate account in the CNY currency lends ¥690 to the liability account of the client in the CNY currency.

TABLE 8

Advance funding flow

| Account | Currency | Change direction | Balance before change | Change amount | Balance after change |
|---|---|---|---|---|---|
| Asset account of advance funding intermediate account | CNY | Out | 0 | ¥690 | −690 |
| Asset account of client | CNY | In | 0 | ¥690 | +690 |
| Liability account of advance funding intermediate account | CNY | Out | 0 | ¥690 | −690 |
| Liability account of client | CNY | In | 0 | ¥690 | +690 |

Account reconciliation may also be referred to as repayment. In the foregoing advance funding process, the arrears balance of the client is equal to the asset account balance of the client, and a repayment amount is not higher than the arrears balance. During the account reconciliation, a direction of a fund flow is exactly opposite to a direction of advancing funding: Money is paid from the asset account of the client to the asset account of the advance funding intermediate account. Money is paid from the liability account of the client to the liability account of the advance funding intermediate account. For each account, an amount of pay-out is equal to an amount of pay-in.

Figure 16B:
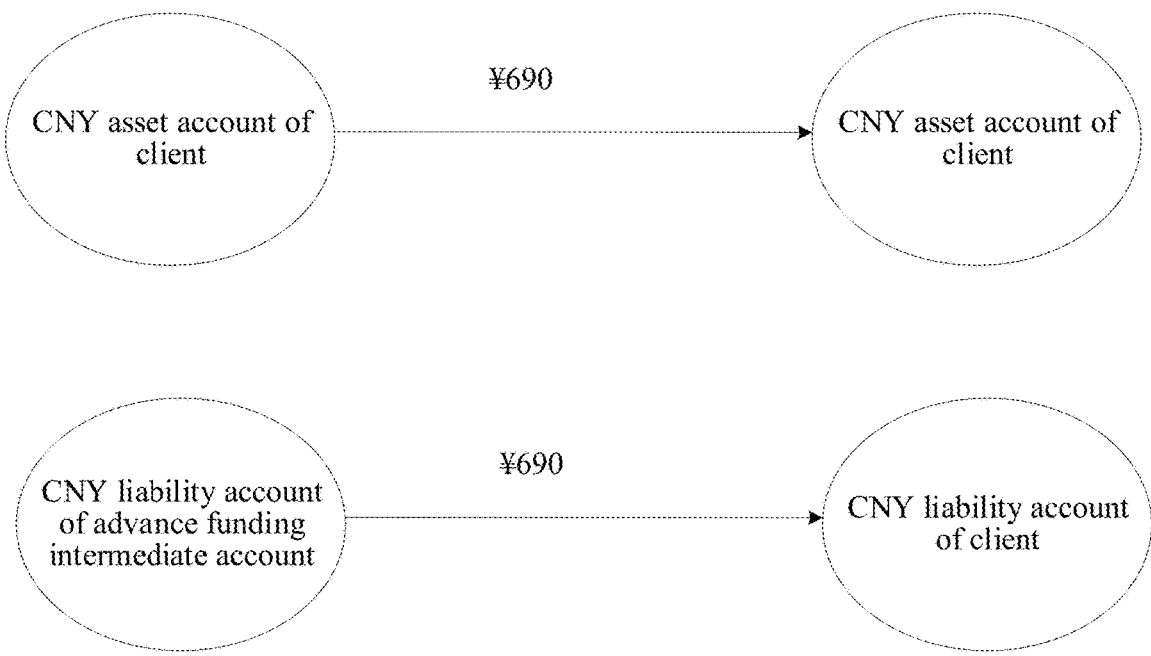
FIG. 16B is a schematic diagram of a fund flow for account reconciliation according to an embodiment of this application.

For example, as shown in FIG. 16B, the asset account of the client in the CNY currency lends ¥690 to the asset account of the advance funding intermediate account in the CNY currency. In addition, the liability account of the client in the CNY currency lends ¥690 to the liability account of the advance funding intermediate account in the CNY currency.

TABLE 9

Account reconciliation fund flow

| Account | Currency | Balance before change | Change direction | Change amount | Balance after change |
|---|---|---|---|---|---|
| Asset account of advance funding intermediate account | CNY | −690 | In | ¥690 | 0 |
| Asset account of client | CNY | +690 | Out | ¥690 | 0 |
| Liability account of advance funding intermediate account | CNY | −690 | In | ¥690 | 0 |
| Liability account of client | CNY | +690 | Out | ¥690 | 0 |

Figure 17:
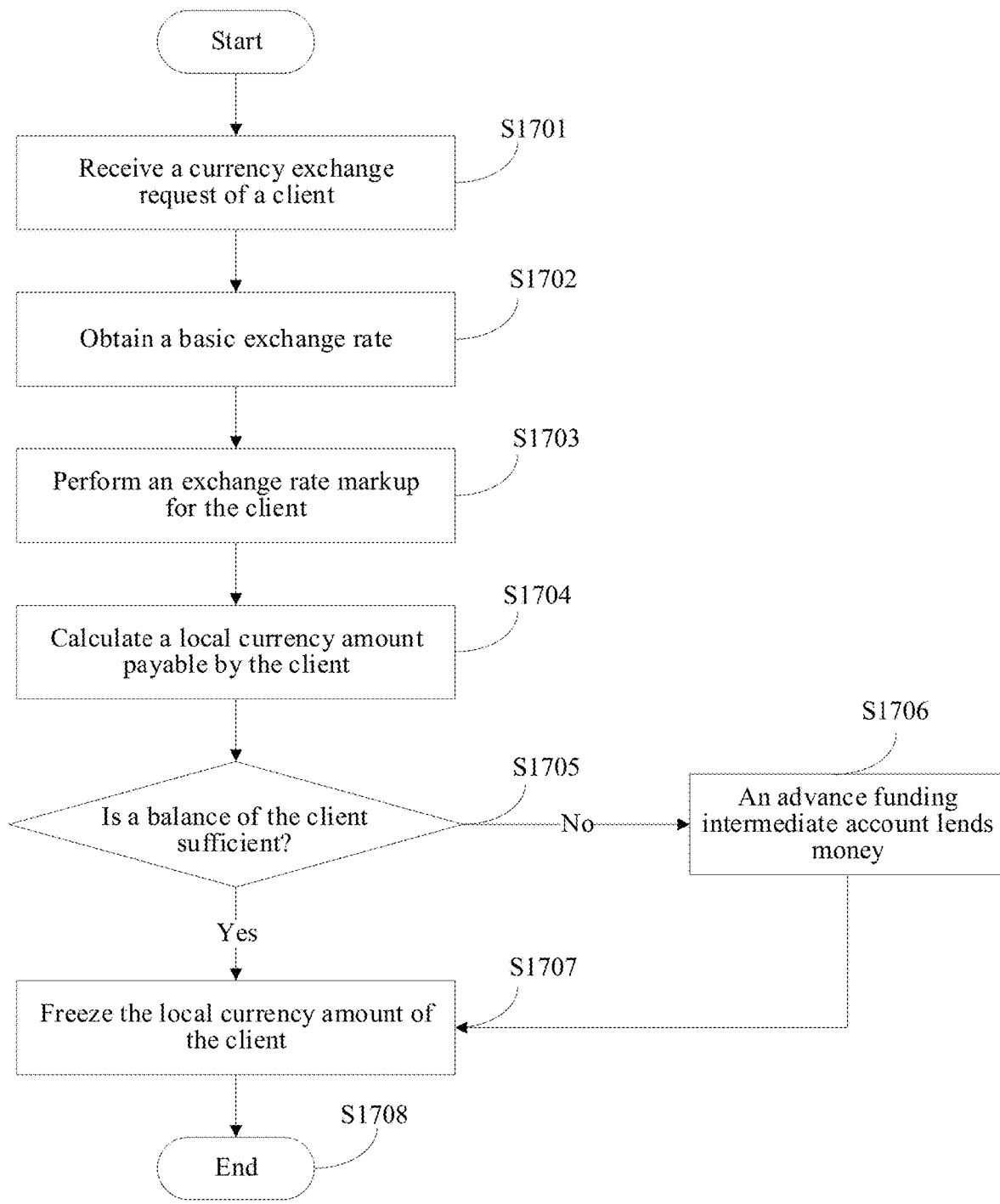
FIG. 17 is a flowchart of initiating a foreign currency purchase according to an embodiment of this application.

FIG. 17 is a flowchart of a foreign currency purchase initiation according to an embodiment of this application.

As shown in FIG. 17, in an embodiment of this application, an initiation stage of a foreign currency purchase may include the following steps.

In step S1701, a currency exchange request of the client is received.

In a foreign currency trade, the system receives the currency exchange request transmitted by the client, and after the currency exchange is completed, fund settlement of the system needs to be performed. The system receives the exchange request transmitted by the client. The client specifies a currency to be purchased and a currency to be sold, that is, the specified local currency and foreign currency, and a specified amount of a foreign currency to be purchased.

In step S1702, a basic exchange rate is obtained.

In step S1703, an exchange rate markup for the client is performed.

In step S1704, a local currency amount payable by the client is calculated.

In step S1705, whether the balance of the client is sufficient is determined. In a case that the balance of the client is insufficient, proceed to step S1706; and in a case that the balance of the client is sufficient, jump to step S1707.

In step S1706, an advance funding intermediate account lends money.

In step S1707, the local currency amount of the client is frozen.

In step S1708, the operation is ended.

The system quotes the client according to a market basic exchange rate+fixed markup, calculates the local currency amount payable by the client, and freezes the local currency funds of the client. If the balance of the client account is insufficient, the advance funding intermediate account first advances funding to "lend money" to the client, and then freezes the local currency funds of the client.

Figure 18:
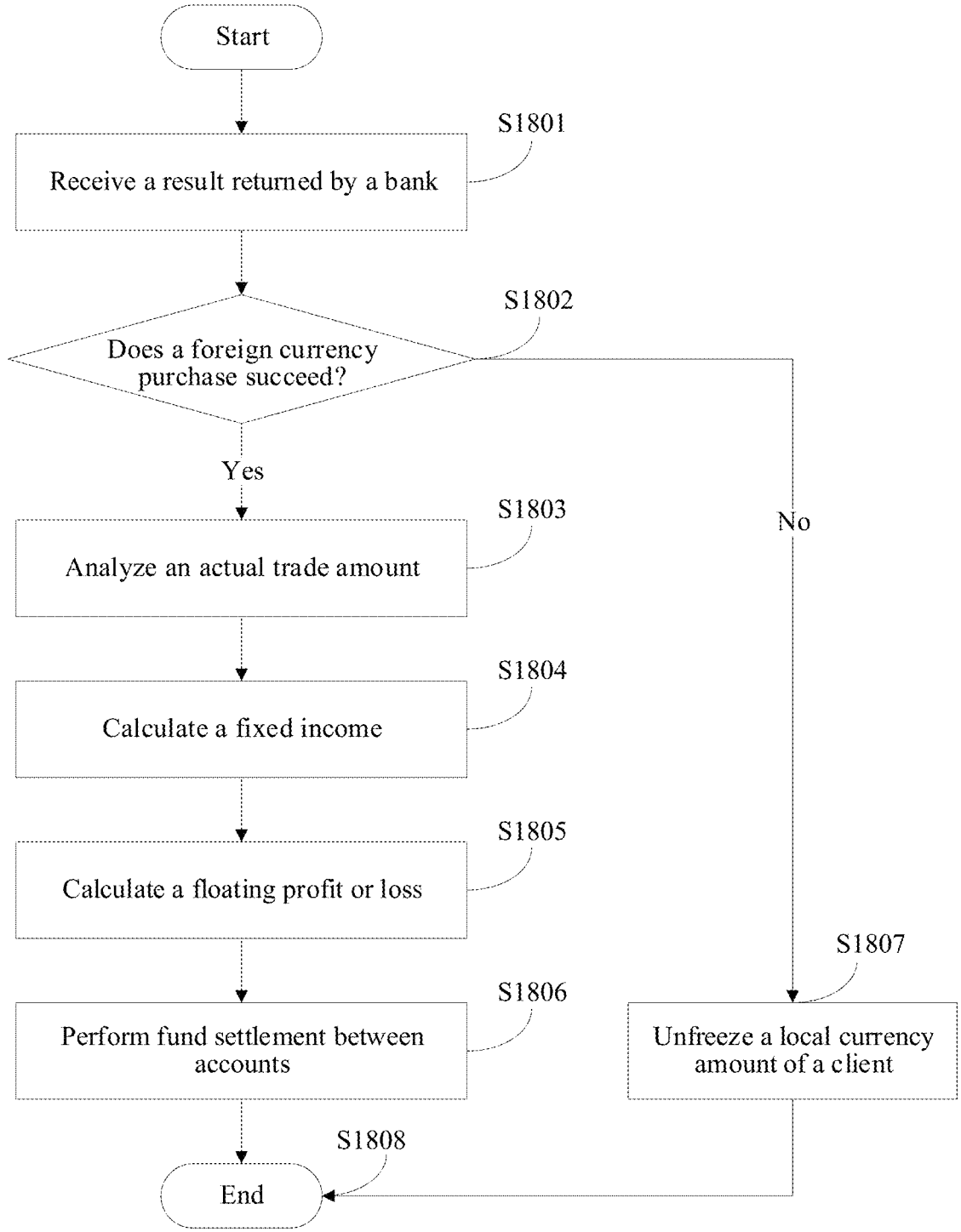
FIG. 18 is a flowchart of a repurchase of a foreign currency according to an embodiment of this application.

FIG. 18 is a flowchart of a repurchase of a foreign currency according to an embodiment of this application. As shown in FIG. 18, in this embodiment of this application, a foreign currency repurchase stage may include the following steps.

In step S1801, a result returned by a bank is received.

The system submits an exchange request to a downstream channel bank, where the exchange request includes purchasing a currency, selling a currency, and specifying an amount of a foreign currency to be purchased. The channel bank returns a foreign currency purchase result as response information, including an actual trade exchange rate and an actual deduction amount in the local currency.

In step S1802, whether a foreign currency purchase succeeds is determined. In a case that the foreign currency purchase succeeds, proceed to step S1803; and in a case that the foreign currency purchase fails, jump to step S1807.

In step S1803, an actual trade amount is analyzed.

In step S1804, a fixed income is calculated.

In step S1805, a floating profit or loss is calculated.

The system calculates the fixed income and the floating profit or loss according to an amount quoted to the client, a benchmark amount of the system, and an actual trade amount of a channel, and a calculation formula may be as follows:

$$\text{Fixed income (local currency)} = \text{Quoted amount} - \text{Benchmark amount} \quad (3)$$

$$\text{Floating profit or loss (local currency)} = \text{Actual trade amount} - \text{Benchmark amount} \quad (4)$$

where:

Quoted amount=Foreign currency amount specified to be purchased*Quoted exchange rate   (5)

Benchmark amount=Foreign currency amount specified to be purchased*Basic exchange rate   (6)

Quoted exchange rate=Basic exchange rate+Markup points   (7)

In step S1806, fund settlement between accounts is performed.

Amount transfers are performed between accounts according to the foregoing calculation amount.

In step S1807, the local currency amount of the client is unfrozen.

In step S1808, the operation is ended.

Descriptions are made below by using fund settlement in a currency exchange process as an example. An example in which the client initiates a CNY-USD currency exchange request (that is, the client requests to exchange CNY into USD, and the same is true for other currencies) is configured for describing a fund settlement process:

(1) At an initiation stage of a foreign currency exchange request of the client, it is assumed that the request of the client and market basic exchange rate parameters are shown in Table 10 below:

TABLE 10

Initiation of a foreign currency exchange request

| Scenario | There is a markup, there is a profit | |
|---|---|---|
| Foreign currency purchase of merchant | USD | 100 |
| Basic exchange rate | | 6.8 |
| Benchmark amount | CNY | 680 |
| Markup points given to client by platform | | 0.1 |
| Exchange rate (markup) given to client by platform | | 6.9 |
| Quotation (markup) given to client by platform | CNY | 690 |

After the markup calculation, CNY ¥690 of the client needs to be frozen. If the balance of the client is insufficient, ¥690 needs to be "borrowed" in an advance funding manner from the advance funding intermediate account, and a fund flow is shown in FIG. 19.

Figure 19:
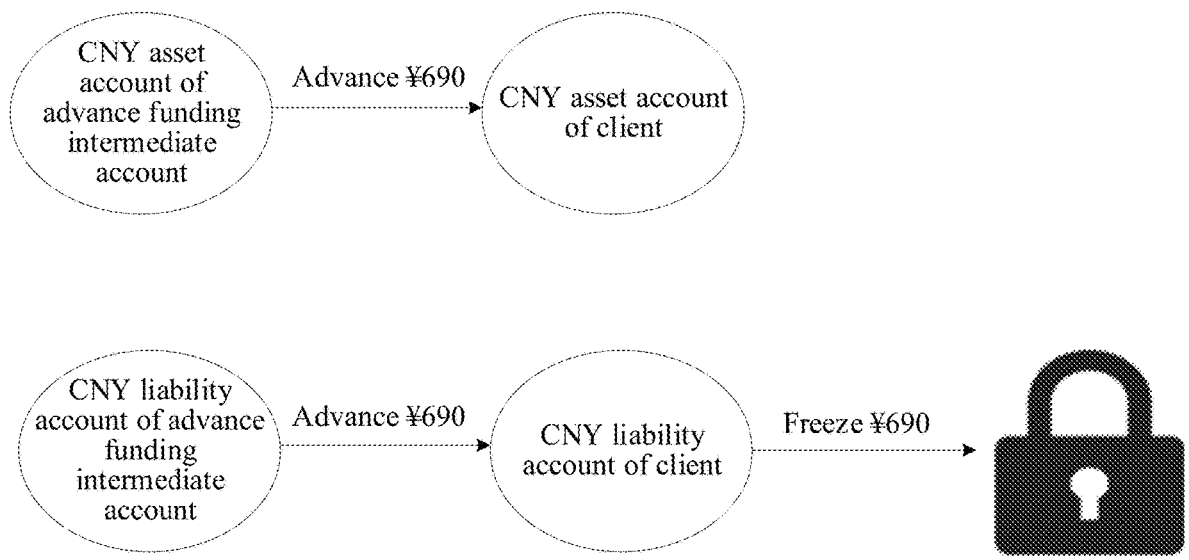
FIG. 19 is a schematic diagram of a fund flow initiated by a foreign currency purchase performed by a client according to an embodiment of this application.

As shown in FIG. 19, a CNY asset account of the advance funding intermediate account lends ¥690 to the CNY asset account of the client. A CNY liability account of the advance funding intermediate account lends ¥690 to the CNY liability account of the client, and freezes ¥690 in the CNY liability account of the client.

TABLE 11

Fund flow of initiation of a currency exchange by a client

| Account | Currency | Change direction | Change amount | Balance after change |
|---|---|---|---|---|
| Asset account of advance funding intermediate account | CNY | Out | ¥690 | −690 |
| Asset account of client | CNY | In | ¥690 | +690 |
| Liability account of advance funding intermediate account | CNY | Out | ¥690 | −690 |
| Liability account of client | CNY | In | ¥690 | +690 |
| Liability account of client | CNY | Freeze | ¥690 | +690 |

Descriptions are made by using a full borrowing manner as an example, that is, in an advance funding process, a balance of an account of the client in a corresponding currency does not need to be considered. Provided that a balance is insufficient, a local currency amount payable by the client in the same currency is borrowed from the advance funding intermediate account provided by the system. For example, in the foregoing example, even if there is RMB 200 in the RMB balance of the client, RMB 690 instead of RMB 490 is borrowed. The full borrowing manner is simpler and more convenient for illustration purposes.

In another embodiment, a differential borrowing manner may alternatively be adopted, that is, it is first considered how much the balance of the account of the client in the currency is, and then a difference between the local currency amount payable by the client and a balance of the account in the local currency as an amount of money borrowed from the advance funding intermediate account.

In an advance funding process, the asset account of the client is used to record the arrears of the client, the balance of the asset account of the client represents the arrears balance of the client, and an asset balance of the advance funding intermediate account may represent the current arrears balance of all clients.

Because the liability account balance of the client is configured for actual trades, the frozen funds are recorded on the liability account of the client.

In addition, in an initiation stage of a foreign currency purchase, because there is no physical bank account change involved, there is only a system fund flow without a physical fund flow.

In a foreign currency repurchase stage, it is assumed that an actual trade result is shown in Table 12 below:

TABLE 12

Repurchase of a foreign currency

| Scenario | There is a markup, there is a profit | |
|---|---|---|
| Foreign currency purchase of merchant | USD | 100 |
| Basic exchange rate | | 6.8 |
| Benchmark amount | CNY | 680 |
| Markup points given to client by platform | | 0.1 |
| Exchange rate (markup) given to client by platform | | 6.9 |
| Quotation (markup) given to client by platform | CNY | 690 |
| Actual trade exchange rate | | 6.75 |
| Actual trade amount | CNY | 675 |

It can be seen that because the actual trade exchange rate is different from an exchange rate when a foreign currency purchase is initiated, the actual trade amount is inconsistent with the benchmark amount, which may result in a floating profit or loss. In addition, when a foreign currency purchase by a client is initiated, the foreign currency exchange platform performs an exchange rate markup on the client, so that a fixed income is also generated.

Figure 20:
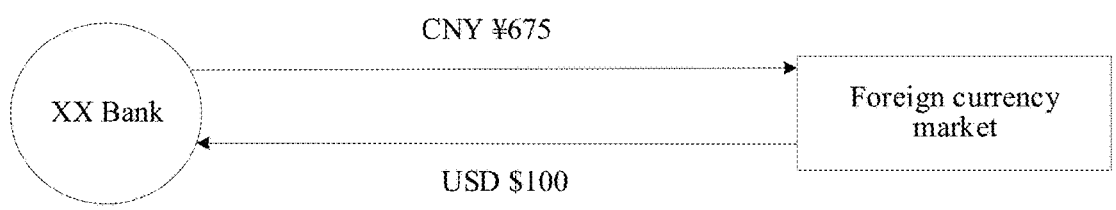
FIG. 20 is a schematic diagram of a physical fund flow according to an embodiment of this application.

As shown in FIG. 20, according to the foregoing currency exchange result, a physical fund flow is to pay ¥675 from a CNY account of XX Bank to a foreign currency trade market, and the foreign currency trade market returns USD $100 to a USD account of XX Bank.

Figure 21:
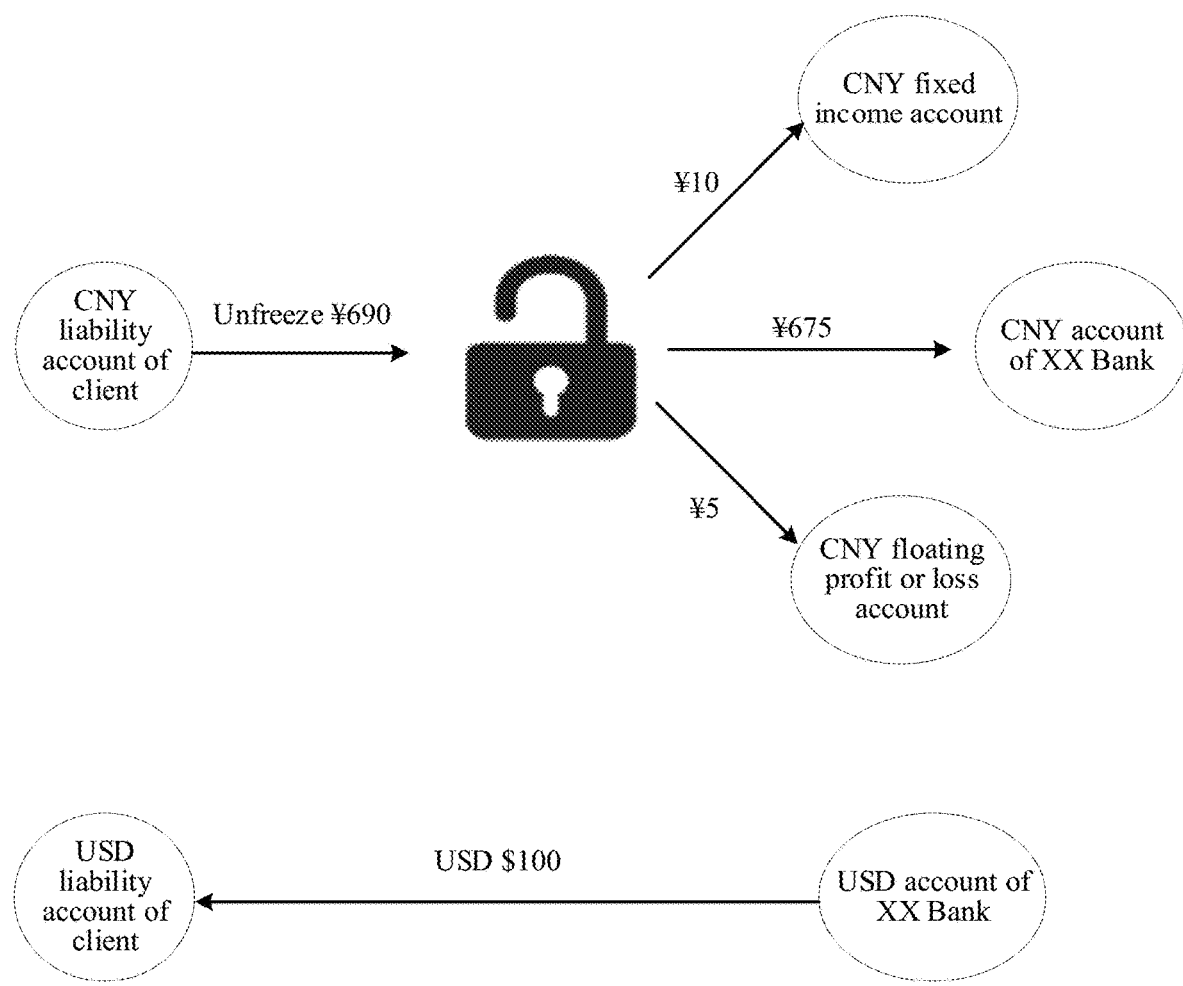
FIG. 21 is a schematic diagram of a system fund flow according to an embodiment of this application.

FIG. 21 schematically shows a schematic diagram of a system fund flow according to an embodiment of this application.

As shown in FIG. 21, according to the foregoing currency exchange result, a system fund flow is to unfreeze ¥690 in the CNY liability account of the client, transfer ¥10 of the ¥690 to a CNY fixed income account, transfer ¥675 of the ¥690 to the CNY account of XX Bank, and transfer ¥5 of the ¥690 to a CNY floating profit or loss account. In addition, the USD account of XX Bank transfers USD $100 to the USD liability account of the client. As shown in Table 13:

TABLE 13

| Account | Currency | Change direction | Change amount | Balance after change |
| --- | --- | --- | --- | --- |
| Asset account of advance funding intermediate account | CNY | — | — | −¥690 |
| Asset account of client | CNY | — | — | +¥690 |
| Liability account of advance funding intermediate account | CNY | — | — | −¥690 |
| Liability account of client | CNY | Freeze | ¥690 | 0 |
| XX Bank | CNY | In | ¥675 | +¥690 |
| Fixed income | CNY | In | ¥10 | +¥10 |
| Floating profit or loss | CNY | In | ¥5 | +¥5 |
| XX Bank | USD | Out | $ 100 | −$100 |
| Liability account of client | USD | In | $ 100 | +$100 |

In the physical fund flow, after the foreign currency purchase of XX Bank is completed, a deduction of CNY 675 and an increase of USD 100 are recorded in a physical account of the currency exchange platform. In the system fund flow, a change in a system account of XX Bank corresponds to a change in the physical account, and there is a settlement between the liability account and income account of the client.

In one embodiment of this application, all of the foregoing tables can be stored on a database server. The database software may use an open source MySQL (relational database management system) server to reduce procurement costs, but this application is not limited thereto.

Referring to FIG. 23, in some embodiments, an architecture of one active database and a plurality of backup databases (that is, one active device+a plurality of backup devices) is adopted, and a database high-availability system is built through semi-synchronization or the MySQL Group Replication (MGR) technology to improve the robustness of the database.

The technical solutions provided in the embodiments of this application can be used as bottom-level component modules to provide support for upper-level services. The technical solutions may be applied to the following scenarios:

(1) Foreign currency purchase trade service: Using the foreign currency exchange platform as an example, a most basic underlying account system can be provided for clients and downstream channels connected to the foreign currency exchange platform. By using such an account system, the currency exchange platform may have a plurality of clients and downstream channels connected thereto, and their quantities are not limited. In addition, different currency accounts can be flexibly created for the clients and the channels according to actual needs of the clients and capabilities actually supported the channels.

If the currency exchange platform receives a large quantity of foreign currency purchase requests at the same time, considering the scalability, a distributed architecture can be used, including providing nearby access at an access layer, a traffic load balancing and overload protection mechanism, multi-machine deployment of system modules, and the like.

(2) Collection and payment service: Compared with the related single-currency (RMB) collection and payment systems, after the account system provided in the embodiments of this application is used, the multi-currency collection and payment service can be supported, which brings more commercial application scenarios for service development.

The collection and payment service is a service that financial institutions take advantage of their own settlement facilities to accept the entrustment of the client to handle collection and payment of specified funds on its behalf.

(3) Personal credit business: In the Internet finance, the personal credit business is a very important part. The account system and fund settlement solution provided in the embodiments of this application are applicable to a credit business scenario and can be configured for the credit business scenario.

In addition, as a underlying account system solution, the method provided in the embodiments of this application can be applied to various service scenarios, and is applicable to a foreign currency exchange trade service according to one or more embodiments, and has the following advantages: the solution is applicable to a wide range of scenarios, and the system account setting is highly flexible; when the balance of the client is insufficient, the advance funding intermediate account can "lend money" to the client, which greatly improves the flexibility of the service; and through a dual account solution, a arrears balance of each client can be checked in real time, which is convenient for collection.

In another embodiment, it is also possible to design corresponding fee and interest collection plans for advance funding arrears.

In the foregoing embodiments, an advance funding process in a foreign currency purchase process is illustrated, and the advance funding solution may also be used in a foreign currency payment process. By distinguishing different trade types in an account flow, it is also possible to distinguish different types of advance funding, to use different fees and interest rates, thereby improving the foregoing fee and interest collection solution.

The method provided in one or more embodiments of this application can be combined with technologies such as the blockchain, so that the technical solution can be implemented on the blockchain, thereby achieving better effects.

Figure 24:
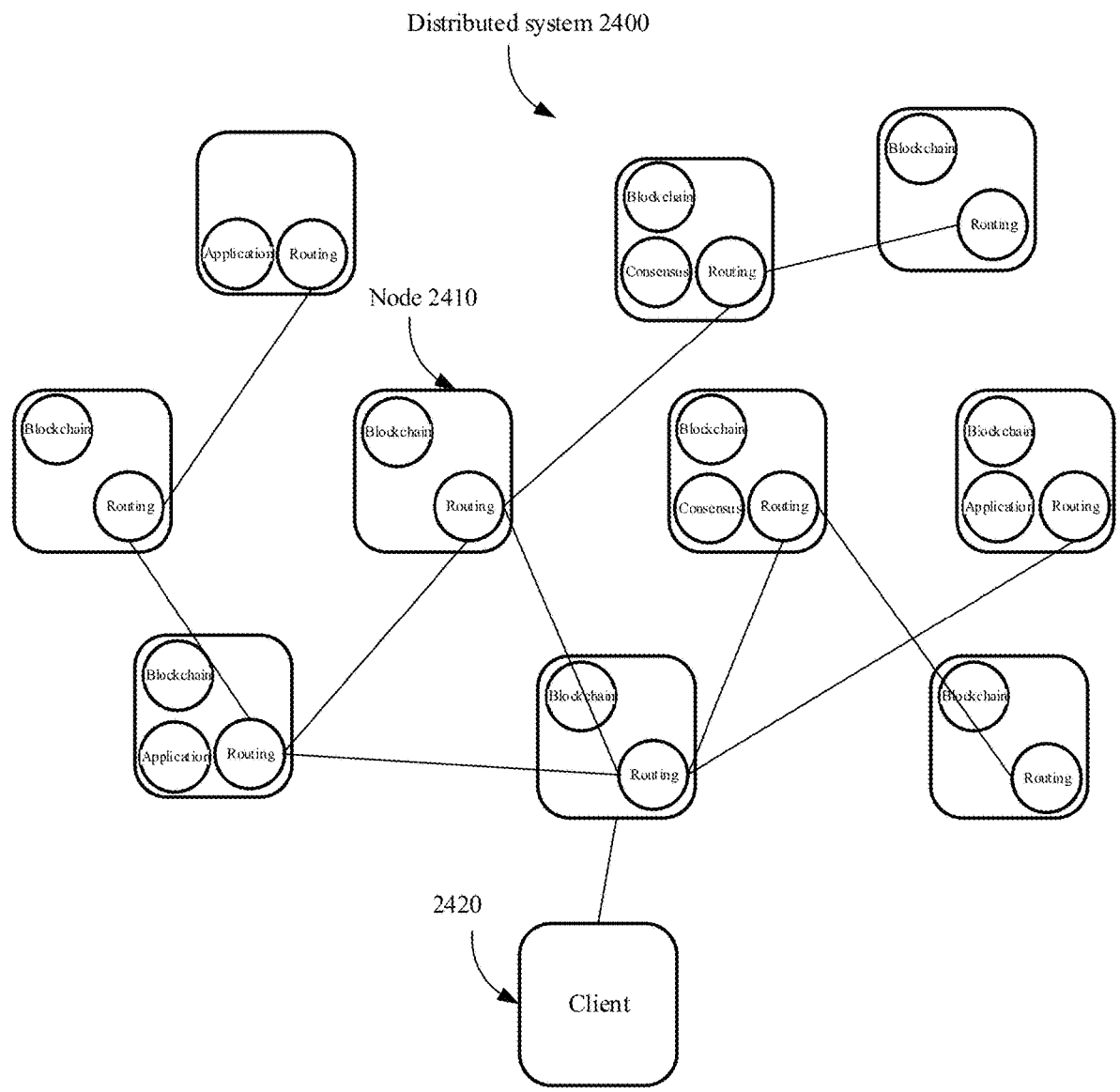
FIG. 24 is a diagram of applying a distributed system to a blockchain system according to an embodiment of this application.

FIG. 24 is a schematic diagram of applying a distributed system to a blockchain system according to an embodiment of this application.

The system related to the embodiments of this application may be a distributed system formed by connecting a client 2420 to a plurality of nodes 2410 (computing devices in any form in an access network, such as, servers and user terminals) in a network communication form.

Using a distributed system as a blockchain system as an example, FIG. 24 is a schematic diagram of applying a distributed system 2400 to a blockchain system according to an embodiment of this application. The distributed system is formed of a plurality of nodes (computing devices in any form in an access network, such as, servers and user terminals) and a client. A peer-to-peer (P2P) network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer.

Referring to functions of each node in the blockchain system shown in FIG. 24, the related functions include the following:

(1) Routing: which is a basic function of a node, and is configured to support communication between nodes.

In addition to the routing function, the node may further have the following functions:

(2) Application: which is deployed in a blockchain, and is configured to implement a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data.

For example, services implemented by the application include:

(2.1) Wallet: providing a trade function with electronic money, including trade initiation (that is, a trade record of a current trade is transmitted to another node in the blockchain system, and the another node stores, after successfully verifying the trade record, recorded data of the trade to a temporary block in a blockchain in response to admitting that the trade is valid); and certainly, the wallet further supports querying for remaining electronic money in an electronic money address.

(2.2) Shared ledger: providing functions of operations such as storage, query, and modification of account data. Recorded data of the operations on the account data is transmitted to another node in the blockchain system. The another node stores, after verifying that the account data is valid, the recorded data to a temporary block in response to admitting that the account data is valid, and may further transmit an acknowledgment to a node initiating the operations.

(2.3) Smart contract: which is a computerized protocol, may be configured for executing conditions of a contract, and is implemented by using code that is deployed in the shared ledger and that is executed when a condition is satisfied. The code is configured to complete, according to an actual service requirement, an automated trade, for example, looking up a delivery status of goods purchased by a purchaser, and transferring electronic money of the purchaser to an address of a merchant after the purchaser signs for the goods. Certainly, the smart contract is not limited only to a contract configured for executing a trade, and may be further a contract configured for processing received information.

(3) Blockchain: including a series of blocks that are consecutive in a chronological order of generation. Once a new block is added to the blockchain, the new block is no longer removed. The block records recorded data submitted by the node in the blockchain system.

Figure 25:
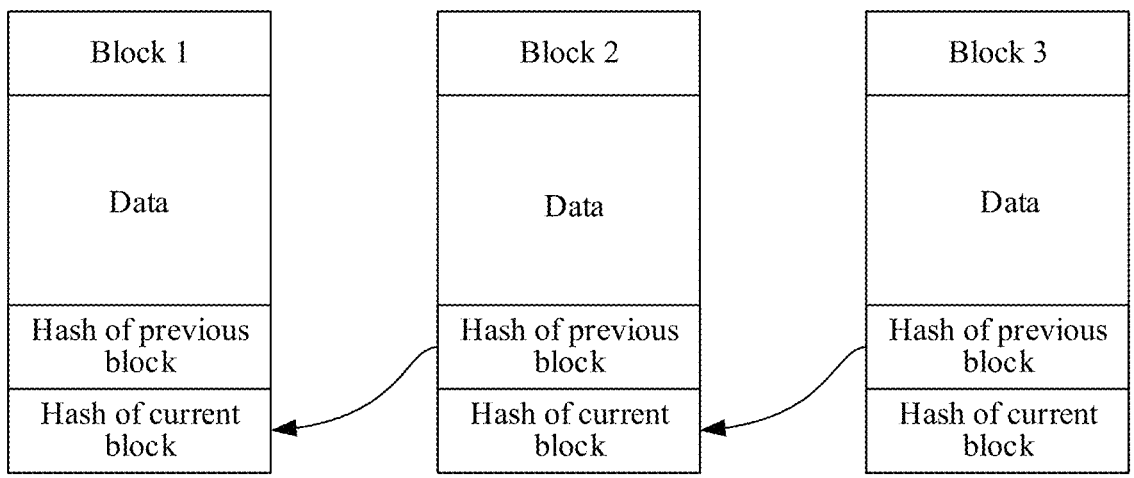
FIG. 25 is a diagram of composition of a block structure according to an embodiment of this application.

FIG. 25 is a diagram of composition of a block structure according to an embodiment of this application.

Referring to FIG. 25, each block includes a hash value of a trade record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

The following describes apparatus embodiments of this application, and the apparatus embodiments can be configured to perform the data resource processing method of this application. Additional details regarding the apparatus embodiments of this application can be found with reference to the embodiments of the data resource processing method advanced above.

Figure 26:
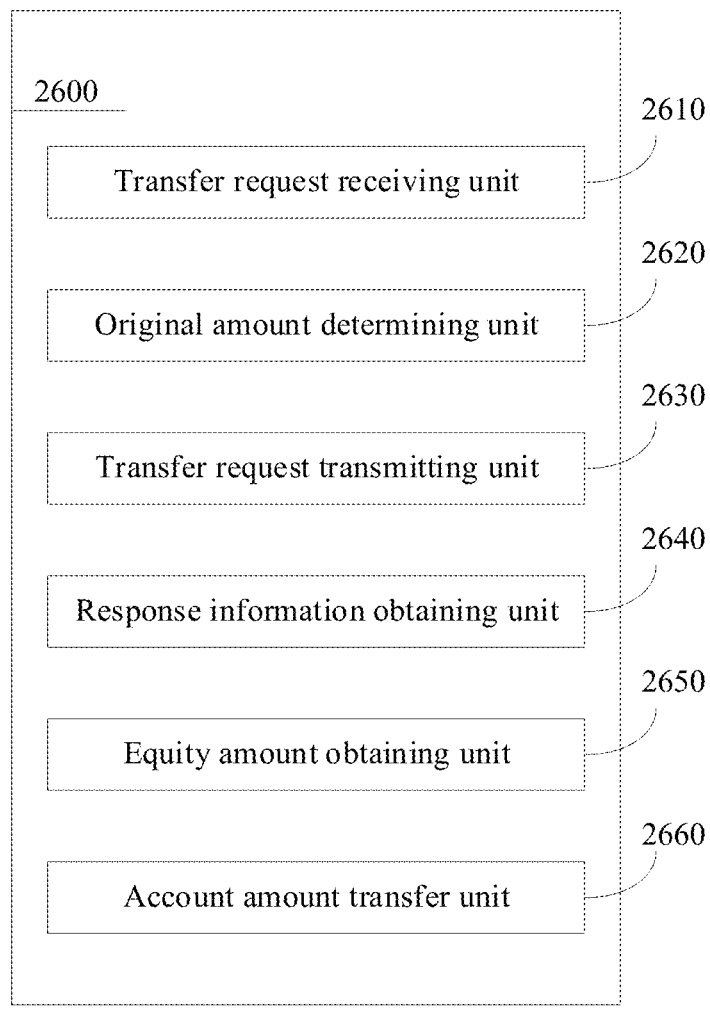
FIG. 26 is a block diagram of a data resource processing apparatus according to an embodiment of this application.

FIG. 26 is a block diagram of a data resource processing apparatus according to an embodiment of this application.

Referring to FIG. 26, the data resource processing apparatus 2600 provided in the embodiments of this application may include: a transfer request receiving unit 2610, an original amount determining unit 2620, a transfer request transmitting unit 2630, a response information obtaining unit 2640, an equity amount obtaining unit 2650, and an account amount transfer unit 2660.

In some embodiments, the transfer request receiving unit 2610 can be configured to receive a data resource transfer request from a target service object (or a service target), the data resource transfer request including a target data resource type, an original data resource type, and a target data resource transfer amount. The original amount determining unit 2620 can be configured to determine an original data resource transfer amount according to the target data resource transfer amount. The transfer request transmitting unit 2630 can be configured to transmit the data resource transfer request to a target service provider object (or a service provider). The response information obtaining unit 2640 can be configured to obtain response information in response to the data resource transfer request from the target service provider object, the response information including an actual deduction amount of the original data resource type.

The equity amount obtaining unit 2650 can be configured to obtain an equity amount of the original data resource type according to the target data resource transfer amount and the actual deduction amount. The account amount transfer unit 2660 can be configured to perform amount transfers between a first-type system account of the target service object, a second-type system account of the target service provider object, and a system equity account according to the equity amount, the original data resource transfer amount, the actual deduction amount, and the target data resource transfer amount.

In an exemplary embodiment, the original amount determining unit 2620 may include: a benchmark indicator obtaining unit, configured to obtain a benchmark indicator between the target data resource type and the original data resource type; a quotation indicator generation unit, configured to generate a quotation indicator between the target data resource type and the original data resource type according to the benchmark indicator; a transferred amount determining unit, configured to determine the original data resource transfer amount according to the quotation indicator and the target data resource transfer amount; and an original data resource transfer amount freezing unit, configured to freeze the original data resource transfer amount in a first-type system account of the original data resource type of the target service object.

In an exemplary embodiment, the data resource processing apparatus 2600 may further include: a remaining amount obtaining unit, configured to obtain, before the original data resource transfer amount in the first-type system account of the original data resource type of the target service object is frozen, the remaining amount in the first-type system account of the original data resource type of the target service object; and a liability advance funding unit, configured to transfer the original data resource transfer amount from a first-type system account of the original data resource type of a system intermediate account to the first-type system account of the original data resource type of the target service object in a case that the remaining amount is less than the original data resource transfer amount.

In an exemplary embodiment, the data resource processing apparatus 2600 may further include: an asset advance funding unit, configured to transfer the original data resource transfer amount from a second-type system account of the original data resource type of the system intermediate account to a second-type system account of the original data resource type of the target service object.

In an exemplary embodiment, the remaining amount obtaining unit may include: a service object external number obtaining unit, configured to obtain an external number of the target service object; a service object association table lookup unit, configured to look up a client account association table of the target service object according to the external number, to obtain the first-type system account of the original data resource type of the target service object; and a service object balance table lookup unit, configured to look up an account balance table of the target service object according to the first-type system account of the original data resource type of the target service object, to obtain the remaining amount in the first-type system account of the original data resource type of the target service object.

In an exemplary embodiment, the data resource processing apparatus 2600 may further include: a current type determining unit, configured to determine a current type, the current type including the target data resource type and the original data resource type; a service object association table querying unit, configured to query the client account association table of the target service object according to the current type; a client account generation unit, configured to generate a first-type system account and a second-type system account that correspond to the current type in a case that the first-type system account and the second-type system account that correspond to the current type do not exist in the client account association table; and a client account writing unit, configured to write the first-type system account and the second-type system account that correspond to the current type into the client account association table.

In an exemplary embodiment, the data resource processing apparatus 2600 may further include: an account balance table querying unit, configured to query the account balance table of the target service object according to the current type; and a balance account generation unit, configured to, write the first-type system account and the second-type system account that correspond to the current type into the account balance table in a case that the first-type system account and the second-type system account that correspond to the current type do not exist in the account balance table.

In an exemplary embodiment, the data resource processing apparatus 2600 may further include: a service object external number generation unit, configured to generate the external number of the target service object; a service object internal number generation unit, configured to generate an internal number of the target service object corresponding to the external number; and an external and internal number association unit, configured to write the external number and the internal number into the client account association table of the target service object.

In an exemplary embodiment, the equity amount obtaining unit 2650 may include: a quoted amount obtaining unit, configured to obtain a quoted amount according to the target data resource transfer amount and the quotation indicator; a benchmark amount obtaining unit, configured to obtain a benchmark amount according to the target data resource transfer amount and the benchmark indicator; a fixed income obtaining unit, configured to obtain a fixed income of the original data resource type according to the quoted amount and the benchmark amount; and a floating profit or loss obtaining unit, configured to obtain a floating profit or loss of the original data resource type according to the actual deduction amount and the benchmark amount.

In an exemplary embodiment, the system equity account may include a fixed income account and a floating profit or loss account. The account amount transfer unit 2660 may include: an original data resource transfer amount unfreezing unit, configured to unfreeze the original data resource transfer amount in a first-type system account of the original data resource type of the target service object; a fixed income transfer unit, configured to transfer the fixed income from the first-type system account of the original data resource type of the target service object to a fixed income account of the original data resource type; a floating profit or loss transfer unit, configured to transfer the floating profit or loss from the first-type system account of the original data resource type of the target service object to a floating profit or loss account of the original data resource type; an actual deduction transfer unit, configured to transfer the actual deduction amount from the first-type system account of the original data resource type of the target service object to a second-type system account of the original data resource type of the target service provider object; and a foreign currency transfer unit, configured to transfer the target data resource transfer amount from a second-type system account of the target data resource type of the target service provider object to a first-type system account of the target data resource type of the target service object.

Although a plurality of units of a device configured to perform actions are discussed in the foregoing detailed description, such division is not mandatory. In fact, according to the implementations of this application, features and functions of two or more units described above may be specified in one unit. On the contrary, the features or functions of one unit described above may further be divided and specified by a plurality of units. Of course, it should be understood that one or more of the units described in this disclosure can be implemented by hardware, for example, circuitry.

Through descriptions of the foregoing implementations, a person skilled in the art can easily understand that the exemplary implementations described herein may be implemented by software or by combining software with necessary hardware. Therefore, the technical solutions of the implementations of this application may be implemented in a form of a software product. The software product may be stored in a non-transitory storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this application.

What is claimed is:
1. A resource transfer processing method, the method comprising:
receiving, by a distributed client login gateway server, a currency exchange request from a client, the currency exchange request comprising an original currency, a target currency, and an exchange amount;
in response to receiving the currency exchange request, automatically performing by a distributed currency exchange platform obtaining, a basic exchange rate corresponding to the currency exchange request;

performing an exchange rate markup for the client, the exchange rate markup increasing the basic exchange rate based on at least one of the client, a preset point value, or a percentage of the basic exchange rate;

calculating, based on the exchange rate markup and the exchange amount, an original currency amount payable by the client to execute the currency exchange;

determining, based on a shared ledger application of a blockchain, that a balance of a client original currency account is insufficient to pay the calculated original currency amount payable by the client at a time of the currency exchange request;

based on the determination that the balance of the client original currency account is insufficient at the time of the currency exchange request, processing in real-time a loan from an advance funding intermediate account to the client original currency account and storing the processed loan as a block in the blockchain;

performing in real-time a target currency purchase based on the currency exchange request using the client original currency account by (i) placing a fixed income based on the exchange rate markup into a fixed income account, (ii) placing, in a floating profit or loss account, profit from exchange rate fluctuations between a time when the basic exchange rate was obtained and a time when the target currency exchange was performed, and (iii) purchasing the target currency with remaining portion of the original currency amount payable by the client, wherein at least (iii) is stored as a block in the blockchain, wherein the distributed currency exchange platform is configured to perform traffic load balancing and overload protection by offloading concurrent trade requests to different servers.

2. The resource transfer processing method according to claim 1, further comprising:

freezing the original currency amount in the client original currency account.

3. The resource transfer processing method according to claim 2, wherein, before the freezing, the method further comprises:

obtaining the balance of the client original currency account; and based on the determination that the balance of the client original currency account is insufficient, processing the loan by transferring the original currency amount from the advance funding intermediate account to the client original currency account.

4. The resource transfer processing method according to claim 3, further comprising:

processing the loan by recording the original currency amount transferred from the advance funding intermediate account to the client original currency account.

5. The resource transfer processing method according to claim 3, wherein the obtaining the balance of the client original currency account comprises:

obtaining an external number of the client original currency account;

looking up in an account balance table, based on the external number of the client original currency account, the balance of the client original currency account.

6. The resource transfer processing method according to claim 5, further comprising:

determining a current exchange type, the current exchange type comprising the target currency and the original currency;

querying a client account association table according to the current exchange type;

in response to a determination that a client target currency account and the client original currency account do not exist in the client account association table, generating the client target currency account and the client original currency account; and writing the client target currency account and the client original currency account that correspond to the current exchange type into the client account association table.

7. The resource transfer processing method according to claim 6, further comprising:

querying the account balance table according to the current exchange type; and in response to a determination that the client target currency account and the client original currency account do not exist in the account balance table, writing the client target currency account and the client original currency account that correspond to the current exchange type into the account balance table.

8. The resource transfer processing method according to claim 6, further comprising:

generating the external number of the client original currency account;

generating an internal number of the client original currency account corresponding to the external number; and writing the external number and the internal number into the client account association table.

9. The resource transfer processing method according to claim 2, further comprising:

calculating the fixed income in the original currency according to the original currency amount and the exchange rate markup; and calculating a floating profit or loss in the original currency according to a difference between an actual exchange rate and the basic exchange rate.

10. The resource transfer processing method according to claim 9, further comprising:

unfreezing the original currency amount in the client original currency account;

transferring the fixed income from the client original currency account to a fixed income account of the original currency;

transferring the floating profit or loss from the client original currency account to a floating profit or loss account of the original currency;

transferring a remaining amount of the original currency amount from the client original currency account to an original currency account of an exchange service provider; and transferring a target currency amount from a target currency account of the exchange service provider to a client target currency account of the client.

11. A data resource processing apparatus, the apparatus comprising:

processing circuitry of a distributed client login gateway server configured to receive a currency exchange request from a client, the currency exchange request comprising a target currency, an original target currency, and an exchange amount; and processing circuitry of a distributed currency exchange platform configured to, in response to receiving the currency exchange request, automatically obtain a basic exchange rate corresponding to the currency exchange request;

perform an exchange rate markup for the client, the exchange rate markup increasing the basic exchange rate based on at least one of the client, a preset point value, or a percentage of the basic exchange rate;

calculate, based on the exchange rate markup and the exchange amount, an original currency amount payable by the client to execute the currency exchange;

determine, based on a shared ledger application of a blockchain, that a balance of a client original currency account is insufficient to pay the calculated original currency amount payable by the client at a time of the currency exchange request;

based on the determination that the balance of the client original currency account is insufficient at the time of the currency exchange request, process in real-time a loan from an advance funding intermediate account to the client original currency account and storing the processed loan as a block in the blockchain; and perform in real-time a target currency purchase based on the currency exchange request using the client original currency account by (i) placing a fixed income based on the exchange rate markup into a fixed income account, (ii) placing, in a floating profit or loss account, profit from exchange rate fluctuations between a time when the basic exchange rate was obtained and a time when the target currency exchange was performed, and (iii) purchasing the target currency with remaining portion of the original currency amount payable by the client, wherein at least (iii) is stored as a block in the blockchain, wherein the processing circuitry of the distributed currency exchange platform is configured to perform traffic load balancing and overload protection by offloading concurrent trade requests to different servers.

12. The data resource processing apparatus according to claim 11, wherein the processing circuitry is further configured to:

freeze the original currency amount in the client original currency account.

13. The data resource processing apparatus according to claim 12, wherein the processing circuitry is further configured to, before freezing the original currency amount in the client original currency account:

obtain the balance of the client original currency account; and based on the determination that the balance of the client original currency account is insufficient, process the loan by transferring the original currency amount from the advance funding intermediate account to the client original currency account.

14. The data resource processing apparatus according to claim 12, wherein the processing circuitry is further configured to:

calculate the fixed income in the original currency according to the original currency amount and the exchange rate markup; and calculate a floating profit or loss in the original currency according to a difference between an actual exchange rate and the basic exchange rate.

15. The data resource processing apparatus according to claim 14, wherein the processing circuitry is further configured to:

unfreeze the original currency amount in the client original currency account;

transfer the fixed income from the client original currency account to a fixed income account of the original currency;

transfer the floating profit or loss from the client original currency account to a floating profit or loss account of the original currency;

transfer a remaining amount of the original currency amount from the client original currency account to an original currency account of an exchange service provider; and transfer a target currency amount from a target currency account of the exchange service provider to a client target currency account of the client.

16. A non-transitory computer-readable storage medium storing instructions which when executed by at least one processor cause the at least one processor to perform:

receiving, by a distributed client login gateway server, a currency exchange request from a client, the currency exchange request comprising an original currency, a target currency, and an exchange amount;

in response to receiving the currency exchange request, automatically performing by a distributed currency exchange platform obtaining a basic exchange rate corresponding to the currency exchange request;

performing an exchange rate markup for the client, the exchange rate markup increasing the basic exchange rate based on at least one of the client, a preset point value, or a percentage of the basic exchange rate;

calculating, based on the exchange rate markup and the exchange amount, an original currency amount payable by the client to execute the currency exchange;

determining, based on a shared ledger application of a blockchain, that a balance of a client original currency account is insufficient to pay the calculated original currency amount payable by the client at a time of the currency exchange request;

based on the determination that the balance of the client original currency account is insufficient at the time of the currency exchange request, processing in real-time a loan from an advance funding intermediate account to the client original currency account and storing the processed loan as a block in the blockchain;

performing in real-time a target currency purchase based on the currency exchange request using the client original currency account by (i) placing a fixed income based on the exchange rate markup into a fixed income account, (ii) placing, in a floating profit or loss account, profit from exchange rate fluctuations between a time when the basic exchange rate was obtained and a time when the target currency exchange was performed, and (iii) purchasing the target currency with remaining portion of the original currency amount payable by the client, wherein at least (iii) is stored as a block in the blockchain, wherein the distributed currency exchange platform is configured to perform traffic load balancing and overload protection by offloading concurrent trade requests to different servers.

17. The non-transitory computer-readable storage medium according to claim 16, further comprising:

freezing the original currency amount in the client original currency account.

18. The non-transitory computer-readable storage medium according to claim 17, wherein, before the freezing, the instructions which when executed by the at least one processor further cause the at least one processor to perform:

obtaining the balance of the client original currency account; and based on the determination that the balance of the client original currency account is insufficient, processing the loan by transferring the original currency amount from the advance funding intermediate account to the client original currency account.

19. The non-transitory computer-readable storage medium according to claim 17, further comprising:

calculating the fixed income in the original currency according to the original currency amount and the exchange rate markup; and calculating a floating profit or loss in the original currency according to a difference between an actual exchange rate and the basic exchange rate.

20. The non-transitory computer-readable storage medium according to claim 19, further comprising:

unfreezing the original currency amount in the client original currency account;

transferring the fixed income from the client original currency account to a fixed income account of the original currency;

transferring the floating profit or loss from the client original currency account to a floating profit or loss account of the original currency;

transferring a remaining amount of the original currency amount from the client original currency account to an original currency account of an exchange service provider; and transferring a target currency amount from a target currency account of the exchange service provider to a client target currency account of the client.

* * * * *